(12) United States Patent
Campos et al.

(10) Patent No.: US 7,080,055 B2
(45) Date of Patent: Jul. 18, 2006

(54) BACKLASH COMPENSATION WITH FILTERED PREDICTION IN DISCRETE TIME NONLINEAR SYSTEMS BY DYNAMIC INVERSION USING NEURAL NETWORKS

(75) Inventors: Javier Campos, Arlington, TX (US);
Frank L. Lewis, Arlington, TX (US)

(73) Assignee: Board of Regents, The University of Texas System

(*) Notice: Subject to any disclaimer, the term of this patent is extended or adjusted under 35 U.S.C. 154(b) by 175 days.

(21) Appl. No.: 09/969,549

(22) Filed: Oct. 2, 2001

(65) Prior Publication Data
US 2004/0015933 A1 Jan. 22, 2004

Related U.S. Application Data

(60) Provisional application No. 60/237,580, filed on Oct. 3, 2000.

(51) Int. Cl.
G06E 1/00 (2006.01)
G06E 3/00 (2006.01)
G06F 15/18 (2006.01)
G06G 7/00 (2006.01)
G06N 3/06 (2006.01)

(52) U.S. Cl. ............................ 706/31; 706/15; 706/21
(58) Field of Classification Search ................. 706/31, 706/15, 21
See application file for complete search history.

(56) References Cited

U.S. PATENT DOCUMENTS

| | | | |
|---|---|---|---|
| 5,495,158 A | 2/1996 | Schmidt et al. | 318/561 |
| 5,710,498 A | 1/1998 | Yutkowitz et al. | 318/632 |
| 5,943,660 A | 8/1999 | Yesildirek et al. | 706/10 |
| 5,946,449 A | 8/1999 | Dickerson et al. | 395/95 |
| 6,060,854 A | 5/2000 | Yutkowitz | 318/632 |
| 6,064,997 A | 5/2000 | Jagannathan et al. | 706/23 |
| 6,185,469 B1 | 2/2001 | Lewis et al. | 700/99 |
| 6,198,246 B1 | 3/2001 | Yutkowitz | 318/561 |
| 6,259,221 B1 | 7/2001 | Yutkowitz | 318/561 |
| 6,281,650 B1 | 8/2001 | Yutkowitz | 318/561 |
| 6,326,758 B1 * | 12/2001 | Discenzo | 318/609 |
| 6,646,397 B1 * | 11/2003 | Discenzo | 318/439 |

OTHER PUBLICATIONS

J. Compos et al, Backlash Compensation in Discrete Time Nonlinear systems Using Dynamic Inversion by Neural Networks: A preliminary approach, Nov. 1999, Journal of Adaptive Control and Signal Processing, 1-25 plus appendix.*

(Continued)

Primary Examiner—Joseph P. Hirl
(74) Attorney, Agent, or Firm—Fulbright & Jaworski LLP

(57) ABSTRACT

Methods and apparatuses for backlash compensation. A dynamics inversion compensation scheme is designed for control of nonlinear discrete-time systems with input backlash. The techniques of this disclosure extend the dynamic inversion technique to discrete-time systems by using a filtered prediction, and shows how to use a neural network (NN) for inverting the backlash nonlinearity in the feedforward path. The techniques provide a general procedure for using NN to determine the dynamics preinverse of an invertible discrete time dynamical system. A discrete-time tuning algorithm is given for the NN weights so that the backlash compensation scheme guarantees bounded tracking and backlash errors, and also bounded parameter estimates. A rigorous proof of stability and performance is given and a simulation example verifies performance. Unlike standard discrete-time adaptive control techniques, no certainty equivalence (CE) or linear-in-the-parameters (LIP) assumptions are needed.

15 Claims, 6 Drawing Sheets

OTHER PUBLICATIONS

Seon-Woo Lee, Control of Systems with Deadzones Using Neural-Network Based Learning Controller, 1994, IEEE, 0-7803-1901-X, 2535-2538.*

Waybackmachine, http://www2.latech.edu/~rselmic/.*

Waybackmachine, http://arri.uta.edu/acs/jcampos/.*

Barron, "Universal approximation bounds for superposition of a sigmoidal function," *IEEE Trans. Inform. Theory*, 39(3): 930-945, 1993.

Bernotas et al., "Adaptive control of electrically stimulated muscle," *IEEE Trans. on Biomedical Engineering*, 34: 140-147, 1987.

Byrnes and Lin, "Losslessness, feedback equivalence, and the global stabilization of discrete-time nonlinear systems," *IEEE Transactions of Automatic Control*, 39(1): 83-98, 1994.

Campos and Lewis, "Deadzone compensation in discrete time using adaptive fuzzy logic," *Proc. IEEE Conference on Decision and Control*, 2920-2926, Tampa, FL, 1998.

Campos et al., "Backlash compensation in discrete time nonlinear systems using dynamic inversion by neural networks: A preliminary approach," *submitted to the special issue on Developments in Intelligent Control for Industrial Applications of the Int. Journal of Adaptive Control and Signal Processing*, Nov. 1999.

Chen and Khalil, "Adaptive control of a class of nonlinear discrete-time systems using neural networks," *IEEE Trans. Automat. Cont.*, 40:791-801, 1995.

Corless and Leitmann, "Continuous state feedback guaranteeing uniform ultimate boundedness for uncertain dynamic systems," *IEEE Trans. Automat. Contr.*, AC-26:1139-1144, 1981.

Cybenko, "Approximations by superpositions of a sigmoidal function," *Math. Contr. Signals, Syst.*, 2:303-314, 1989.

Desoer and Shahruz, "Stability of dithered non-linear systems with backlash or hysteresis," *Int. J. Contr.*, 43:1045-1060, 1986.

Grundelius and Angelli, "Adaptive control of systems with backlash acting on the input," *Proceedings of the 35th Conference on Decision and Control*, pp. 4689-4694, Kobe, Japan, 1996.

Gullapalli et al., "Acquiring robot skills via reinforcement learning," *IEEE Cont. Syst.*, Feb. 13-24, 1994.

Haddad et al., "Optimal discrete-time control for nonlinear cascade systems," *Proceedings of the American Control Conference*, pp. 2175-2176, Albuquerque, NM, 1997.

Han and Zhong, "Robust adaptive control of time-varying systems with unknown backlash nonlinearity," *Proceedings of the American Control Conference*, pp. 763-767, Albuquerque, NM, 1997.

Hornik et al., "Multilayer feedforward networks are universal approximators," *Neural Networks* 2: 359-366, 1989.

Igelnik and Pao, "Stochastic Choice of Basis Functions in Adaptive Function Approximation and the Functional-Link Net," *IEEE Trans. Neural Networks*, 6:1320-1329, 1995.

Ioannou and Datta, "Robust adaptive control: a unified approach," *Proc. IEEE*, 790(12): 1736-1768, 1991.

Jagannathan and Lewis, "Discrete-Time Control of a Class of Nonlinear Dynamical Systems," *Int. Journal of Intelligent Control and Systems*, 1(3): 297-326, 1996.

Jagannathan and Lewis, "Robust backstepping control of robotic systems using neural networks," *J. Intelligent and Robotic Sys.*, 23:105-128, 1998.

Kim and Calise, "Nonlinear flight control using neural networks," *Journal of Guidance, Control, and Dynamics*, 20:26-33, 1997.

Kim et al., "A two-layered fuzzy logic controller for systems with deadzones," *IEEE Trans. Industrial Electron.*, 41:155-162, 1994.

Kim et al., "Fuzzy precompensation of PID controllers," *Proc. IEEE Conf. Control Applications*, pp. 183-188, Sep. 1993.

Kosko, *Neural Networks and Fuzzy Systems*, Prentice Hall, New Jersey, 1992.

Krstic et al., *Nonlinear and Adaptive Control Design*, John Wiley & Sons, New York, NY, 1995.

Kwan et al., "Robust neural-network control of rigid-link electrically driven robots," *IEEE Trans. Neural Networks*, 9:581-588, 1998.

Lee and Kim, "Control of systems with deadzones using neural-network based Learning control," *Proc. IEEE Int. Conf. Neural Networks*, pp. 2535-2538, 1994.

Leitner et al., "Analysis of adaptive neural networks for helicopter flight control," *Journal of Guidance, Control, and Dynamics*, 20:972-979, 1997.

Lewis et al., "Adaptive fuzzy logic compensation of actuator deadzones," *J. Robot. Sys.*, 14:501-511, 1997.

Lewis et al., "Multilayer neural-net robot controller with guaranteed tracking performance," *IEEE Trans. Neural Networks*, 7:388-399, 1996.

Lewis et al., "Neural net robot controller with guaranteed tracking performance," *IEEE Trans. Neural Networks*, 6(3): 703-715, 1995.

Lewis et al., *Control of Robot Manipulators*, MacMillan, New York, 1993.

Lewis et al., *Neural Network Control of Robot Manipulators and Nonlinear Systems*, Taylor & Francis, Philadelphia, PA 1999.

Li and Cheng, "Adaptive high-precision control of positioning tables—theory and experiment," *IEEE Trans. Control Syst. Technol.*, 2:265-270, 1994.

McFarland and Calise, "Multilayer neural networks and adaptive nonlinear control of agile anti-air missiles," *American Institute of Aeronautics & Astronautics*, 401-410, 1999.

Narendra and Annaswamy, "A new adaptive law for robust adaptation without persistent excitation," *IEEE Trans. Automat. Control*, AC-32:134-145, 1987.

Narendra and Parthasarathy, "Identification and control of dynamical systems using neural networks," *IEEE Trans. Neural Networks*, 1:4-27, 1990.

Narendra, "Adaptive Control Using Neural Networks," *Neural Networks for Control*, Ch. 5, pp. 115-142. ed. W. T. Miller, R. S. Sutton, P. J. Werbos, Cambridge: MIT Press, 1991.

Park and Sandberg, "Criteria for the approximation of nonlinear systems," *IEEE Trans. Circuits Syst.-1*, 39:673-676, 1992.

Park and Sandberg, "Nonlinear approximations using elliptic basis function networks," *Circuits, Systems, and Signal Processing*, 13:99-113, 1993.

Polycarpou, "Stable adaptive neural control scheme for nonlinear systems," *IEEE Trans. Automat. Contr.*, 41:447-451, 1996.

Recker et al., "Adaptive nonlinear control of systems containing a dead zone," *Proc. IEEE Conf. Decis. Control*, 1991, pp. 2111-2115.

Rovithakis and Christodoulou, "Adaptive control of unknown plants using dynamical neural networks," *IEEE Trans. Systems Man and Cybernetics*, 24:400-412, 1994.

Sadegh, "A perceptron network for functional identification and control of nonlinear systems," *IEEE Trans. Neural Networks*, 4:982-988, 1993.

Sanner and Slotine, "Gaussian networks for direct adaptive control," *IEEE Trans. Neural Networks*, 3: 837-863, 1992.

Sanner and Slotine, "Stable recursive identification using radial gaussian networks," *Proc. American Control Conf.*, 1829-1833, 1992.

Selmic and Lewis, "Deadzone compensation in nonlinear systems using neural networks," *Proc. IEEE Conference Decision and Control*, Tampa, FL, 1998.

Selmic and Lewis, "Backlash Compensation in Nonlinear Systems using Dynamic Inversion by Neural Networks," 1163-1168, *IEEE Conference in Control and Automation*, Kona, Hawaii, Aug. 1999.

Selmic and Lewis, "Backlash Compensation in Nonlinear Systems using Dynamic Inversion by Neural Networks," *Asian Journal of Control*, 2(2):76-87, 2000.

Selmic and Lewis, "Deadzone compensation in motion control systems using neural networks," *IEEE Trans. Automat. Control*, 45:602-613, 2000.

Selmic and Lewis, "Neural network approximation of piecewise continuous functions: application to friction compensation," *Proc. IEEE Int. Symp. Intell. Contr.*, 1997.

Slotine and Li, *Applied Nonlinear Control*, New Jersey: Prentice-Hall, 1991.

Slotine and Li., "Adaptive manipulator control: a case study," *IEEE Trans. Automat. Control*, 33(11): 995-1003, 1988.

Song et al., "Control of a class of nonlinear uncertain systems via compensated inverse dynamics approach," *IEEE Trans. Automat. Contr.*, 39:1866-1871, 1994.

Sontag, "Feedback stabilization using two-hidden-layer nets," *IEEE Trans. Neural Networks*, 3:981-990, 1992.

Tao and Kokotovic, "Adaptive control of plants with unknown dead-zones," *Proceedings American Control Conf.*, 2710-2714, Chicago, 1992.

Tao and Kokotovic, "Adaptive control of plants with unknown dead-zones," *IEEE Trans. Automat. Control*, 39:59-68, 1994.

Tao and Kokotovic, "Continuous-time adaptive control of systems with unknown backlash," *IEEE Trans. Automat. Control*, 40:1083-1087, 1995.

Tao and Kokotovic, "Discrete-time adaptive control of systems with unknown deadzones," *Int. J. Control*, 61(1): 1-17, 1995.

Tao and Kokotovic, "Discrete-time adaptive control of systems with unknown nonsmooth input nonlinearities," *Proceedings of the 33rd Conference on Decision and Control*, 1171-1176, Lake Buena Vista, FL, 1994.

Tao and Kokotovic, *Adaptive Control of Systems with Actuator and Sensor Nonlinearities*, John Wiley & Sons, Inc., New York, 1996.

Tao, "Adaptive backlash compensation for robot control," *Proceedings IFAC World Congress*, 307-312, San Francisco, 1996.

Tzes et al., "Neural network control for DC motor micromaneuvering," *IEEE Trans. Ind. Electron.*, 42:516-523, 1995.

Vandergrift et al., "Adaptive fuzzy logic control of discrete-time dynamical systems," *Proc. IEEE Int. Symp. Intelligent Control*, 395-401, Aug. 1995.

Werbos, "Backpropagation through time: what it does and how to do it," *Proc. IEEE*, 78(10): 1550-1560, 1990.

Werbos, "Neurocontrol and supervised learning: an overview and evaluation," in *Handbook of Intelligent Control*, White and Sofge, Eds. NY: Van Nostrand Reinhold, 1992, pp. 65-89, 1992.

Yan and Li, "Robot learning control based on recurrent neural network inverse model," *J. Robot. Sys.*, 14:199-211, 1997.

Yeh and Kokotovic, "Adaptive control of a class of nonlinear discrete-time systems," *International Journal of Control*, 62(2): 303-324, 1995.

Yesildirek and Lewis, "A neural net controller for robots with Hebbian tuning and guaranteed tracking," *Proc. American Control Conference*, Seattle, Washington, pp. 1-6, 1995.

Zhang et al., "Robust adaptive control of uncertain discrete-time systems," *Automatica*, 321-329, 1999.

Co-pending U.S. Appl. No. 09/553,601, filed Apr. 20, 2000.

Campos et al., "Backlash compensation in discrete time nonlinear systems using dynamic inversion by neural networks," *IEEE International Conference on Robotics and Automation*, 2000.

Cruz-Hernandez et al., "Reduction of major and minor hysteresis loops in a piezoelectric actuator," *Proc. 1998. CDC Conference*, 1-6, 1998.

Haffner et al, "A multilayer perceptron replaces a feedback linearization controller in a nonlinear servomechanism," printed from the internet, http://citeseer.ist.psu.edu/434205.html.

Jin et al., Control of nonlinear mechanotronics systems by using universal learning networks, *1999 IEEE International Conference on Systems, Man and Cybernetics*, Oct., vol. 5, 1-6.

Jin et al, "Decentralized adaptive fuzzy control of robot manipulators," *IEEE Transactions on Systems, Man and Cybernetics*, Pa B: Cybernetics, Feb. 1998, vol. 28(1):47-57.

Seidl et al., Neural Network Compensation of Gear Backlash Hysteresis in Position-Controlled Mechanisms, *Conference Reco of the 1993 IEEE Industry Applications Society Annual Meeting*, Oct. 1993, vol. 3, 2027-2034.

Selmic et al, "Neural net backlash compensation with hebbian tuning using dynamic inversion," Submission to: *Automatica*, Nov. 1999.

Shibata et al., Nonlinear backlash compensation using recurrent neural network-unsupervised learning by genetic algorithm, *Proceedings of the 1993 International Joint Conference on Neural Networks*, Oct., vol. 1, 742-745.

Sontag, "Neural networks for control," in *Essays on Control: Perspectives in the Theory and its Applications* (H.L. Trentelman and J.C. Willems, eds.), Birkhauser, 339-380, 1993.

Selmic and Lewis, "Neural net backlash compensation with Hebbian tuning by dynamic inversion," Proceedings of the 39th IEEE Conference on Decision and Control, Sydney, Australia, Dec. 2000.

Selmic et al, Neural net backlash compensation with hebbian tuning using dynamic inversion, *Automatica*, 37:1269-1277, 2001.

\* cited by examiner

BACKLASH COMPENSATION WITH FILTERED PREDICTION IN DISCRETE TIME NONLINEAR SYSTEMS BY DYNAMIC INVERSION USING NEURAL NETWORKS

This application claims priority to provisional patent application Ser. No. 60/237,580 filed Oct. 3, 2000, entitled, "Backlash Compensation with Filtered Prediction in Discrete Time Nonlinear Systems by Dynamic Inversion Using Neural Networks" by Javier Campos and Frank L. Lewis. That entire disclosure is specifically incorporated by reference herein without disclaimer.

The government may own rights to portions of the present invention pursuant to Army Research Office Grant 39657-MA, ARO Grant DAAD19-99-1-0137, and Texas ATP Grant 003656-027.

BACKGROUND OF THE INVENTION

1. Field of the Invention

The present invention relates generally to the fields of neural networks. More particularly, it concerns using neural networks for backlash compensation in mechanical systems.

2. Description of Related Art

Many physical components of control systems have non-smooth nonlinear characteristics such as deadzone and backlash. These are particularly common in actuators, such as mechanical connections, hydraulic servovalves and electric servomotors. The difference between toothspace and tooth width in mechanical system is known as backlash, and it is necessary to allow two gears mesh without jamming. Any amount of backlash greater than the minimum amount necessary to ensure satisfactory meshing of gears can result in instability in dynamics situations and position errors in gear trains. Backlash often severely limits the performance of feedback systems by causing delays, oscillations, and inaccuracy. In fact, there are many applications such as instrument differential gear trains and servomechanisms that require the complete elimination of backlash in order to function properly.

Many mechanical solutions have been developed to overcome backlash, for example spring-loaded split gear assemblies and dual motor systems. These mechanical solutions can satisfactorily handle some backlash problems, but they give rise to other problems like decreased accuracy and reduced bandwidth. They are also expensive, energy consuming and increase the overall weight of the system. A backlash compensation scheme not based on mechanical devices would be more convenient.

In most applications, backlash parameters are either poorly known or completely unknown, which represents a challenge for the control design engineer. Proportional-derivative (PD) controllers have been observed to result in limit cycles if the actuators have nonlinearities such as backlash or deadzones. To overcome the PD controller limitations, several techniques have been applied to compensate for the actuator nonlinearities. These techniques include adaptive control, fuzzy logic and neural networks.

Many systems with actuator nonlinearities such as deadzone and backlash are modeled in discrete time. Moreover, for implementation as a digital controller, a discrete-time actuator nonlinearity compensator is needed. To address discrete-time deadzone compensation, at least one group has proposed a specific adaptive control approach. Also a specific fuzzy logic (FL) deadzone compensation discrete time scheme has been proposed. Adaptive control approaches for backlash compensation in discrete time have also been proposed. These conventional methods, however, all require a linear in the parameter assumption.

Neural Networks (NN) have been used extensively in feedback control systems. Specifically, it has been observed that the use of PD controllers may result in limit cycles if actuators have deadzones or backlash. Rigorous results for motion tracking of such systems are notably sparse, though ad hoc techniques relying on simulations for verification of effectiveness are prolific.

Although some NN applications show at least a degree of utility, most applications, unfortunately, are ad hoc with no demonstration of stability. The stability proofs that do exist rely almost invariably on the universal approximation property for NN. However, in most real industrial control systems there are nonsmooth functions (piecewise continuous) for which approximation results in the literature are sparse or nonexistent. Examples of phenomena involving nonsmooth functions include, but are not limited to, deadzone, friction, and backlash. Though there do exist some results for piecewise continuous functions, traditional attempts to approximate jump functions using smooth activation functions require many NN nodes and many training iterations, and still do not yield very good results. It would therefore be advantageous to have the ability to estimate and compensate nonlinearities, including backlash nonlinearities, involving piecewise continuous functions with guaranteed close-loop stability.

The use of NN has accelerated in recent years in many areas, including feedback control applications. Particularly important in NN control are the universal function approximation capabilities of neural network systems. NN systems offer significant advantages over adaptive control, including no requirement for linearity in the parameters assumptions and no need to compute a regression matrix for each specific system. Dynamics inversion in continuous-time using NN has been proposed, where a NN is used for cancellation of the system inversion error. A continuous time dynamic inversion approach using NN for backlash compensation has also been proposed. A continuous time inverse dynamics approach using adaptive and robust control technique has been proposed as well. A preliminary approach using dynamic inversion for backlash compensation in discrete-time system has been proposed, but was incomplete in that its proof did not rigorously include the effects of a certain predictive filter needed to actually implement the technique.

Dynamic inversion is a form of backstepping, which has been extended to discrete-time systems with limited results. The difficulty with applying those results to discrete-time dynamic inversion is that a future value of a certain ideal control input is needed.

Certain problems facing the field enumerated above are not intended to be exhaustive but rather are among many which tend to impair the effectiveness of previously known estimation and compensation schemes. Other noteworthy problems may and do exist; however, those presented above are sufficient to demonstrate that methods of backlash compensation appearing in the art have not been altogether satisfactory.

SUMMARY OF THE INVENTION

This disclosure provides a discrete-time actuator nonlinearity compensator. In most applications, backlash models are either poorly known or completely unknown. Inverting the backlash nonlinearity even for known backlash models is not an easy task, since the nonlinearity appears in the feedforward path. This disclosure explains the design of an intelligent control system that cancels the unknown backlash nonlinearity, while still keeping the closed loop system stable. This allows faster and more precise control of industrial positioning systems in applications including, but not limited to, robotics, CNC machine tools, and vehicle suspension systems.

Backlash nonlinearities occur in almost all motion control systems. Unfortunately, it introduces errors. The problems are particularly exacerbated when the required accuracy and the speed of motion are high. There are many applications such as instrument differential gear trains and servomechanisms that require the complete elimination of backlash in order to function properly. The backlash compensator by dynamic inversion using a neural network (NN) of this disclosure may be applied in order to improve system performance and cancel the backlash effects. Potential markets are vast and include, but are not limited to, the auto industry, military applications, robotics, mechanical processes, and biomedical engineering.

This disclosure involves a discrete-time dynamic inversion compensation with a filtered prediction for backlash compensation in nonlinear systems. In one embodiment, the compensator uses the dynamic inversion technique with neural networks (NN) for inverting the backlash nonlinearity in the feedforward path. This disclosure shows how to tune the NN weights in discrete-time so that the unknown backlash parameters are learned on-line, resulting in a discrete-time adaptive backlash compensator. Using discrete-time nonlinear stability techniques, the tuning algorithm is shown to guarantee small tracking errors as well as bounded parameter estimates. Since the tracking error, backlash error and the parameter estimation error are weighted in the same Lyapunov function, no certainty equivalence assumption is needed.

The present disclosure extends dynamic inversion techniques to discrete-time systems by using a filtered prediction, and it shows how to use and tune a neural network for inverting backlash nonlinearity in the feedforward path. The techniques of this disclosure offer important improvements to controllers, neural net or otherwise, in that:

(1) The techniques extend the dynamic inversion technique to discrete-time systems;

(2) This is a 'model-free' approach. A neural net is used for inverting the backlash nonlinearity in the feedforward path so that a mathematical model of the backlash is not needed;

(3) The techniques apply for a large class of actuator nonlinearities, not only backlash;

(4) The neural network design algorithm is based on rigorous mathematical stability proofs, and so shows how to guarantee closed-loop stability and performance;

(5) Unlike standard discrete-time adaptive control, no linear-in-the-parameters (LIP) or certainty of equivalence (CE) assumption is required. This requires an exceedingly complex proof, but obviates the need for any sort of LIP or CE assumption. It also allows the parameter-tuning algorithm to be derived during the proof process, not selected a priori in an ad hoc manner;

(6) The tuning algorithms for the neural net weights are innovative, and no preliminary off-line tuning is needed. The weights may be tuned on-line, and the algorithms guarantee stability of the controlled system; and (7) The neural network weights are easily initialized so that the neural net output is zero, and a proportional-derivative (PD) control loop keeps the system stable initially until the weights begin to learn.

The advantages and features of the present invention differentiate it from previously-known methodology. Some of these advantages and features include, but are not limited to, the following:

(1) Other techniques based on discrete-time adaptive control require a certainty equivalence assumption, which often does not hold in practice;

(2) Most backlash compensators using older control technology do not have any performance or stability guarantees. This makes their acceptance by industry questionable.

(3) Other modem backlash compensators that do not use neural nets, e.g. those based on adaptive control, require a strong 'linear in the parameters assumption' that does not often hold for actual industrial systems. This restricts the types of backlash nonlinearities that can be canceled.

(4) Other backlash compensation techniques based on neural networks do not provide design algorithms based on mathematical proofs that guarantee stability of the controlled system. They use standard 'back-propagation' weight tuning, which cannot provide stability in all situations.

(5) Other backlash compensation techniques based on neural networks do not show how to initialize the weights to guarantee performance.

(6) Other techniques based on dynamic inversion have been developed for continuous-time systems, not for discrete-time systems. A discrete-time formulation is needed for digital control.

As shown in the Examples section of this disclosure, simulation results show that a NN backlash compensator according to the present invention may significantly reduce the degrading effect of backlash nonlinearity.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1A:
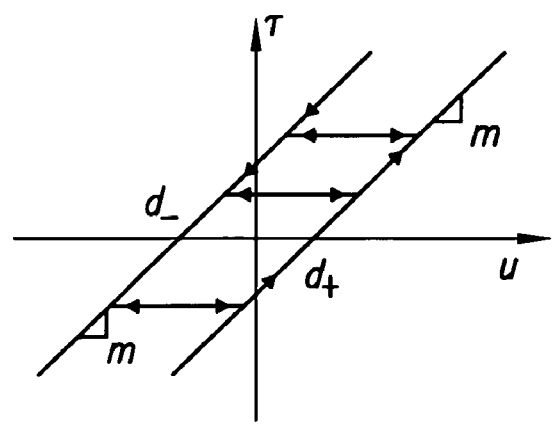
FIG. 1A shows a backlash model according to one embodiment of the present disclosure.

This disclosure provides the complete solution for extending dynamics inversion to discrete-time systems by using a filtered prediction approach for backlash compensation. The general case of nonsymmetric backlash is treated. A rigorous design procedure is given that results in a PD tracking loop with an adaptive NN in the feedforward loop for dynamic inversion of the backlash nonlinearity. The NN feedforward compensator is adapted in such a way as to estimate on-line the backlash inverse. Unlike standard discrete-time adaptive control techniques, no certainty equivalence (CE) assumption is needed since the tracking error and the estimation error are weighted in the same Lyapunov function. Unlike previous conventional techniques, no linearity in the parameters is needed.

Background

General

Let R denote the real numbers, $R^n$ denote the real n-vectors, $R^{m \times n}$ the real m×n matrices. Let S be a compact simply connected set of $R^n$. With maps $f: S \to R^k$, define $C^k(S)$ as the space such that $f$ is continuous. We denote by $\|\cdot\|$ a suitable vector norm. Given a matrix $A=[a_{ij}]$, $A \in R^{n \times m}$ the Frobenius norm is defined by $$\|A\|_F^2 = tr(A^T A) = \sum_{i,j} a_{ij}^2, \quad (1)$$

with tr( ) the trace operation. The associated inner product is $(A,B)_F = tr(A^T B)$. The Frobenius norm $\|A\|_F^2$, which is denoted by $\|\cdot\|$ throughout this disclosure unless specified explicitly, is nothing but the vector 2-norm over the space defined by stacking the matrix columns into a vector, so that it is compatible with the vector 2-norm, that is, $\|Ax\| \leq \|A\| \cdot \|x\|$.

DEFINITION 1: Given a dynamical system $x(k+1)=f(x(k),u(k))$, $y(k)=h(x(k))$, where $x(k)$ is a state vector, $u(k)$ is the input vector and $y(k)$ is the output vector. The solution is Globally Uniformly Ultimately Bounded (GUUB) if for all $x(k_0)=x_0$, there exists an $\epsilon>0$ and a number $N(\epsilon,x_0)$ such that $\|x(k)\|<\epsilon$ for all $k \geq k_{0+N}$.

Dynamics of an mn-th Order MIMO System

Consider an mnth-order multi-input and multi-output discrete-time system given by $$x_1(k+1) = x_2(k) \quad (2)$$
$$\vdots$$
$$x_{n-1}(k+1) = x_n(k)$$
$$x_n(k+1) = f(x(k)) + \tau(k) + d(k),$$

where $x(k)=[x_1(k), x_2(k) \ldots, x_n(k)]^T$ with $x_i(k) \in \mathfrak{R}^n$; $i=1,2,\ldots,n$, $u(k) \in R^m$, and $d(k) \in R^m$ denotes a disturbance vector acting on the system at the instant k with $\|d(k)\| \leq d_M$ a known constant. The actuator output $\tau(k)$ is related to the control input $u(k)$ through the backlash nonlinearity. $\tau(k)=\text{Backlash}(u(k))$ as discussed in the next section. Given a desired trajectory $x_{nd}(k)$ and its delayed values, define the tracking error as $$e_n(k) = x_n(k) - x_{nd}(k). \quad (3)$$

It is typical in robotics to define a so-called the filtered tracking error, as $r(k) \in R^m$, and given by $$r(k) = e_n(k) + \lambda_1 e_{n-1}(k) + \ldots + \lambda_{n-1} e_1(k), \quad (4)$$

where $e_{n-1}(k), \ldots, e_1(k)$ are the delayed values of the error $e_n(k)$, and $\lambda_1, \ldots, \lambda_{n-1}$ are constant matrices selected so that $|z^{n-1}+\lambda_1 z^{n-2}+ \ldots +\lambda_{n-1}|$ is stable or Hurwitz (i.e. $e_n(k) \to 0$ exponentially as $r(k) \to 0$). Equation (4) can be further expressed as $$r(k+1) = e_n(k+1) + \lambda_1 e_{n-1}(k+1) + \ldots + \lambda_{n-1} e_1(k+1). \quad (5)$$

Using Eq. (2) in Eq. (5), the dynamics of the mn-th order MIMO system can be written in terms of the tracking error as $$r(k+1) = f(x(k)) - x_{nd}(k+1) + \lambda_1 e_{n-1}(k) + \ldots + \lambda_{n-1} e_1(k) + \tau(k) + d(k). \quad (6)$$

Neural Networks

Given $x \in \mathfrak{R}^N$, a one-layer feedforward NN has a net output given by $$y_i = \sum_{j=1}^{N_h} [w_{ij} \varphi(x) + \theta_{wi}]; \quad i=1,\ldots,m \quad (7)$$

with $\phi(\cdot)$ the activation functions and $w_{ij}$ the output-layer weights. The $\theta_{wi}, i=1,2,\ldots$, are threshold offsets, and $N_h$ is the number of hidden-layer neurons. In the NN we should like to adapt the weights and thresholds on-line in real time to provide suitable performance of the net. That is, the NN should exhibit "on-line learning while controlling" behavior. The output of a one-layer can be also expressed in matrix form as $$y(x) = W^T \phi(x), \quad (8)$$

where 1 is included as the first element of $\phi(x)$ in order to incorporate the thresholds $\theta_{wi}$ as the first column of $W^T$. Thus, any tuning of W includes tuning of the thresholds as well.

One property of NN we are concerned with for control and estimation purposes is the function approximation property. Let $f(x)$ be a smooth function from $\mathfrak{R}^n \to \mathfrak{R}^m$. Then it can be shown that, as long as x is restricted to a compact set $S \in \mathfrak{R}^n$, for some sufficiently large number of hidden-layer neurons $N_h$, there exist weights and thresholds such that one has $$f(x) = W^T \phi(x) + \epsilon(x). \quad (9)$$

This equation means that a neural network can approximate any continuous function in a compact set. The value of $\epsilon(x)$ is called the neural network functional approximation error. In fact, for any choice of a positive number $\epsilon_N$, one can find a neural network such that $\epsilon(x) \leq \epsilon_N$ for all $x \in S$. For suitable NN approximation properties, $\phi(x)$ must be a basis:

DEFINITION 2: Let S be a compact simply connected set of $\mathfrak{R}^n$ and let $\phi(x): S \to \mathfrak{R}^N_h$ be integrable and bounded. Then $\phi(x)$ is said to provide a basis for $C^m(S)$ if:

1. A constant function on S can be expressed as (7) for finite $N_h$.
2. The functional range of neural network (7) is dense in $C^m(S)$ for countable $N_h$.

It has been shown that the neural network approximation error $\epsilon(x)$ for one-layer NN is fundamentally bounded below by a term of the order $(1/n)^{2/d}$, where n is the number of fixed basis functions and d is the dimension of the input to the NN. This does not limit the tracking performance in controllers of this disclosure because of the control system structure selected.

It is not straightforward to pick a basis $\phi(x)$. CMAC, RBF, and other structured NN approaches allow one to choose a basis by partitioning the compact set S. However, this can be tedious. If one selects $$y(x) = W^T \sigma(V^T x), \qquad (10)$$

with, for instance, $$\sigma(x) = \frac{1}{1 + e^{ax}}$$

the sigmoid, then it has been shown that $\sigma((V^T_x)$ is a basis if V is selected randomly. Once selected, V is fixed and only W is tuned. Then, the only design parameter in constructing the 1-layer NN is the number of hidden layer neurons $N_h$. A larger $N_h$ results in a smaller $\epsilon(x)$.

Backlash Nonlinearity and Backlash Inverse

Figure 1B:
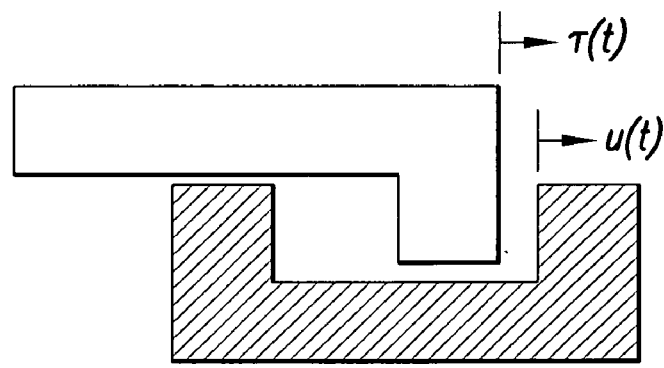
FIG. 1B shows backlash in mechanical connections according to one embodiment of the present disclosure.

Backlash nonlinearity is shown in FIG. 1, and the mathematical model for continuous time is known in the art. For the discrete-time case, one has $$\tau(k+1) = B(\tau(k), u(k), u(k+1)) = \qquad (11)$$
$$\begin{cases} m \cdot u(k+1), & \text{if } u(k+1) > 0 \text{ and } u(k) = m \cdot \tau(k) - m \cdot d_+ \\ & \text{if } u(k+1) < 0 \text{ and } u(k) = m \cdot \tau(k) - m \cdot d_- \\ 0, & \text{otherwise} \end{cases}$$

It can be seen that backlash is a first-order velocity driven dynamic system, with inputs u(k) and u(k+1), and state $\tau(k)$. Backlash contains its own dynamics, therefore its compensation requires the design of a dynamic compensator.

Whenever the motion u(k) changes its direction, the motion $\tau(k)$ is delayed from motion of u(k). One objective of a backlash compensator is to make this delay as small as possible, i.e. to make the throughput from u(k) to $\tau(k)$ be unity. The backlash precompensator needs to generate the inverse of the backlash nonlinearity. The backlash inverse function is shown in FIG. 2.

The dynamics of the NN backlash compensator is given by $$u(k+1) = B_{inv}(u(k), w(k), w(k+1)), \qquad (12)$$

Figure 2:
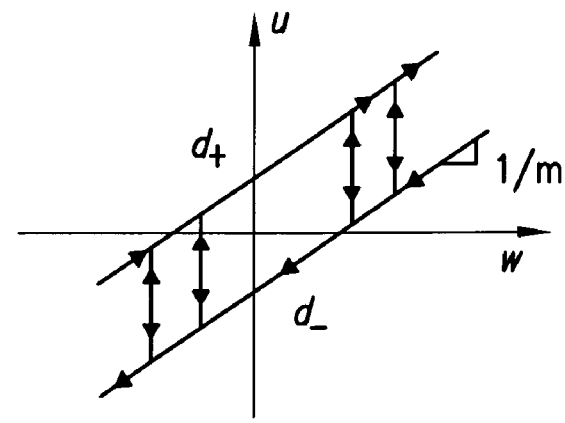
FIG. 2 shows backlash inverse according to one embodiment of the present disclosure.
Figure 3B:
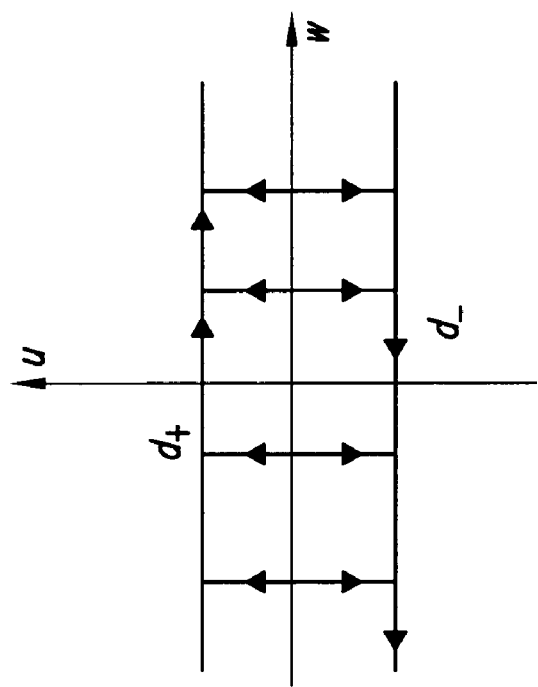
FIGS. 3A and 3B show backlash inverse decomposition according to one embodiment of the present disclosure.
Figure 3A:
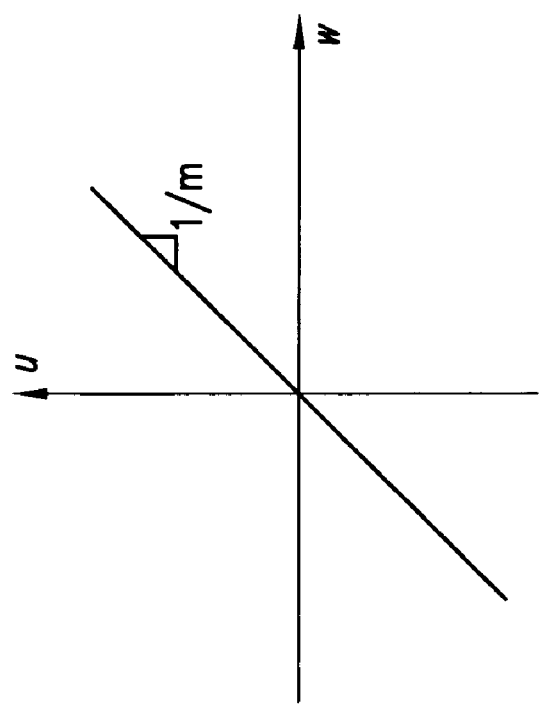

The backlash inverse characteristic shown in the FIG. 2 can be decomposed into two functions: a direct feedforward term plus an additional modified backlash inverse term as shown in FIG. 3. This decomposition allows design of a compensator that has a better structure than when a NN is used directly in the feedforward path.

Discrete Time NN Backlash Compensator

Portions of a discrete time NN backlash compensator according to one embodiment of this disclosure may be designed using backstepping techniques known in the art. In this section it is shown how to tune the NN weights on-line so that the tracking error is guaranteed small and all internal states are bounded. It is assumed that the actuator output $\tau(k)$ is measurable. Unlike conventional techniques, no linearity in the parameters assumption is needed.

Dynamics of Nonlinear System with Backlash

Equation (2) is in the companion form and represents a large class of multi-input multi-output (MINO) nonlinear systems. The overall system dynamics consist of (2) and the backlash dynamics (11).

The following assumptions are needed and they are true in every practical situation and are standard in the existing literature.

Assumption 1 (Bounded disturbance): The unknown disturbance satisfies $\|d(k)\| \leq d_M$, with $d_M$ a known positive constant.

Assumption 2 (Bounded estimation error): The nonlinear function is assumed to be unknown, but a fixed estimate $\hat{f}(x(k))$ is assumed known such that the functional estimation error, $\tilde{f}(x(k)) = f(x(k)) - \hat{f}(x(k))$, satisfies $\|\tilde{f}(x(k))\| \leq f_M(x(k))$, for some known bounding function $f_M(x(k))$.

This assumption is not unreasonable, as in practical systems the bound $f_M(x(k))$ can be computed knowing the upper bound on payload masses, frictional effects, and so on.

Assumption 3 (Bounded desired trajectories): The desired trajectory is bounded in the sense, for instance that $$\left\| \begin{matrix} x_{1d}(k) \\ x_{2d}(k) \\ \vdots \\ x_{nd}(k) \end{matrix} \right\| \leq X_d.$$

Backstepping Controller

A robust compensation scheme for unknown terms in $f(x(k))$ is provided by selecting the tracking controller $$\tau_{des}(k) = K_v \cdot r(k) - \hat{f}(x(k)) + x_{nd}(k+1) - \lambda_1 \cdot e_{n-1}(k) - \lambda_2 \cdot e_{n-2}(k) - \ldots \lambda_{n-1} \cdot e_1(k), \qquad (13)$$

with $\hat{f}(x(k))$ an estimate for the nonlinear terms $f(x(k))$. The feedback gain matrix $K_v > 0$ is often selected diagonal. The problem of finding $\hat{f}(x(k))$ is not the main concern of this disclosure, and it may be found by methods known in the art. This function $f(x(k))$ can be estimated, for instance, using adaptive control techniques or neural network controllers.

Using (13) as a control input, the system dynamics in (6) can be rewritten as $$r(k+1) = K_v \cdot r(k) + \tilde{f}(x(k)) + d(k). \qquad (14)$$

The next theorem is the first step in the backstepping design; and it shows that the desired control law (13) will keep the filtered tracking error small if there is no backlash.

Theorem 1 (Control Law for Outer Tracking Loop)

Consider the system given by equation (2). Assume that Assumptions 1 and 2 hold, and let the control action by provided by (13) with $0 < K_v < I$ being a design parameter.

Then the filtered tracking error r(k) is UUB.

Proof

Let us consider the following Lyapunov function candidate $$L_1(k) = r(k)^T r(k). \qquad (15)$$

The first difference is $$\Delta L_1(k) = r(k+1)^T r(k+1) - r(k)^T r(k) =$$
$$= \left(K_v \cdot r(k) + \tilde{f}(x(k)) + d(k)\right)^T \left(K_v \cdot r(k) + \tilde{f}(x(k)) + d(k)\right) - r(k)^T r(k)$$ (16)

$\Delta L_1(k)$ is negative if $\|K_v r(k) + \tilde{f}(x(k)) + d(k)\| \le K_{v_{\max}} \|r(k)\| + f_M + d_M < \|r(k)\|$ $\Rightarrow (1 - K_{v_{\max}}) \|r(k)\| > f_M + d_M,$ which is true as long as $$\|r(k)\| > \frac{f_M + d_M}{1 - K_{v \max}}.$$ (17)

Therefore, $\Delta L_1(k)$ is negative outside a compact set. According to standard Lyapunov theory extension, this demonstrates the UUB of $r(k)$.

NN Backlash Compensation using Dynamic Inversion

Theorem 1 gives the control law that guarantees stability in term of the filtered tracking error, assuming that no nonlinearity besides the system nonlinear function plus some bounded external disturbances are present. In the presence of unknown backlash nonlinearity, the desired and actual value of the control signal $\tau(k)$ will be different. A dynamics inversion technique by neural networks may be used for compensation of the inversion error. This is a form of backstepping.

The actuator output given by (13) is the desired signal. The complete error system dynamics can be found defining the error $$\tilde{\tau}(k) = \tau_{des}(k) - \tau(k).$$ (18)

Using the desired control input (13), under the presence of unknown backlash the system dynamics (6) can be rewritten as $$r(k+1) = K_v \cdot r(k) + \tilde{f}(x(k)) + d(k) - \tilde{\tau}(k).$$ (19)

Evaluating (18) at the following time interval $$\tilde{\tau}(k+1) = \tau_{des}(k+1) - \tau(k+1) = \tau_{des}(k+1) - B(\tau(k), u(k), u(k+1)).$$ (20)

which together with (19) represents the complete system error dynamics. The dynamics of the backlash nonlinearity can be written as:

$$\tau(k+1) = \phi(k),$$ (21)

$$\phi(k) = B(\tau(k), u(k), u(k+1)),$$ (22)

where $\phi(k)$ is a pseudo-control input. In the case of known backlash, the ideal backlash inverse is given by $$u(k+1) = B^{-1}(u(k), \tau(k), \phi(k)).$$ (23)

Since the backlash and therefore its inverse are not known, one can only approximate the backlash inverse as $$\hat{u}(k+1) = \hat{B}^{-1}(u(k), \tau(k), \phi(k)).$$ (24)

The backlash dynamics can now be written as $$\tau(k+1) = B(\tau(k), \hat{u}(k), \hat{u}(k+1))$$ (25)
$$= \hat{B}(\tau(k), \hat{u}(k), \hat{u}(k+1)) + \tilde{B}(\tau(k), \hat{u}(k), \hat{u}(k+1)),$$
$$= \hat{\phi}(k) + \tilde{B}(\tau(k), \hat{u}(k), \hat{u}(k+1))$$

where $\hat{\phi}(k) = \hat{B}(\tau(k), \hat{u}(k), \hat{u}(k+1))$ and therefore its inverse is given by $\hat{u}(k+1) = \hat{B}^{-1}(\tau(k), \hat{u}(k), \hat{\phi}(k))$. The unknown function $\tilde{B}(\tau(k), \hat{u}(k), \hat{u}(k+1))$, which represents the backlash inversion error, will be approximated using a neural network.

Figure 4:
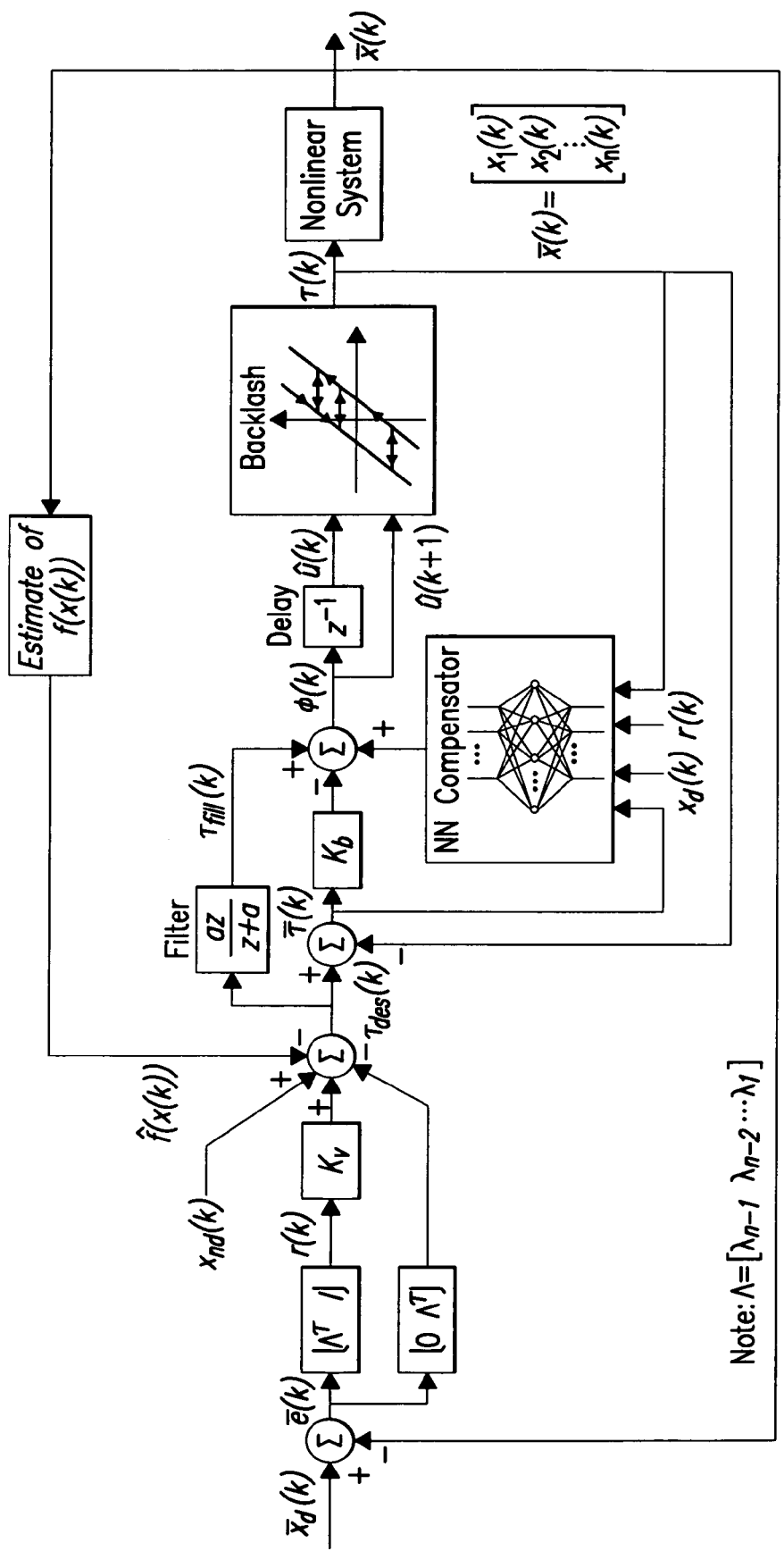
FIG. 4 shows a discrete time neural network compensator for compensating backlash according to one embodiment of the present disclosure.

In order to design a stable closed-loop system with backlash compensation, one selects a nominal backlash inverse $\hat{u}(k+1) = \hat{\phi}(k)$ and pseudo-control input as $$\hat{\phi}(k) = -K_b \tilde{\tau}(k) + \tau_{filt}(k) + \hat{W}(k)^T \sigma(V^T x_{nn}(k)),$$ (26)

where $K_b > 0$ is a design parameter, and $\tau_{filt}$ is a discrete-time filtered version of $\tau_{des}$. $\tau_{filt}$ is a filtered prediction that approximates $\tau_{des}(k+1)$, and is obtained using the discrete-time filter $az/(z+a)$ as shown in FIG. 4. This is the equivalent of using a filtered derivative instead of a pure derivative in continuous-time dynamics inversion, which is standard in industrial control systems. The filter dynamics shown in FIG. 4 can be written as $$\tau_{filt}(k) = -\frac{\tau_{filt}(k+1)}{a} + \tau_{des}(k+1),$$ (27)

where $a$ is a design parameter. It can be seen that when the filter parameter $a$ is large enough we have $\tau_{filt}(k) \approx \tau_{des}(k+1)$. The mismatch term $$-\frac{\tau_{filt}(k+1)}{a}$$

can be approximated along with the backlash inversion error using the NN.

Based on the NN approximation property, the backlash inversion plus the filter error dynamics can be represented as $$\tilde{B}(\tau(k), \hat{u}(k), \hat{u}(k+1)) + \frac{\tau_{filt}(k+1)}{a} = W(k)^T \sigma(V^T x_{nn}(k)) + \varepsilon(k),$$ (28)

where the NN input vector is chosen to be $x_{nn}(k) = [1 \; r(k)^T \; x_d(k)^T \tau(k)^T \tilde{\tau}(k)^T]^T$, and $\varepsilon(k)$ represents the NN approximation error. It can be seen that the first layer of weights is not time dependant since it is selected randomly at initial time to provide a basis and then it is kept constant through the tuning process.

Define the NN weight estimation error as $$\tilde{W}(k) = W(k) - \hat{W}(k), \quad (29)$$

where $\hat{W}(k)$ is the estimate of the ideal NN weights $W(k)$.

Using the proposed controller shown in FIG. 4, the error dynamics can be written as $$\tilde{r}(k+1) = \tau_{des}(k+1) - \hat{\varphi}(k) + \tilde{B}(\tau(k), \hat{u}(k), \hat{u}(k+1)) \quad (30)$$
$$= K_b \tilde{r}(k) + \frac{\tau_{filt}(k+1)}{a} - \hat{W}(k)^T \sigma(V^T x_{nn}(k)) +$$
$$\tilde{B}(\tau(k), \hat{u}(k), \hat{u}(k+1))$$
$$= K_b \tilde{r}(k) - \hat{W}(k)^T \sigma(V^T x_{nn}(k)) + W(k)^T \sigma(V^T x_{nn}(k)) + \varepsilon(k)$$

Using (29), $$\tilde{r}(k+1) = K_b \tilde{r}(k) + \tilde{W}(k)^T \sigma(V^T x_{nn}(k)) + \epsilon(k). \quad (31)$$

The next theorem is an important result, which shows how to tune the neural network weights so the tracking error $r(k)$ and backlash estimation error $\tilde{\tau}(k)$ achieve small values while the NN weights estimation errors $\tilde{W}(k)$ are bounded.

Theorem 2 (Control Law for Backstepping Loop)

Consider the system given by (2). Provided that assumptions 1, 2, and 3 hold, let the control action $\hat{\varphi}(k)$ by provided by (26) with $K_b > 0$ being a design parameter.

Let $u(k+1) = \phi(k)$, and the estimated NN weights be provided by the NN tuning law $$\hat{W}(k+1) = \hat{W}(k) + \alpha\sigma(k)r(k+1)^T + \alpha\sigma(k)$$
$$\tilde{\tau}(k+1)^T - \Gamma\|I - \alpha\sigma(k)\sigma(k)^T\|\hat{W}(k). \quad (32)$$

where $\alpha > 0$ is a constant learning rate parameter or adaptation gain, $\Gamma > 0$ is a design parameter, and for simplicity purposes $\sigma(V^T_{xnn}(k))$ is represented as $\sigma(k)$. Then, the filtered tracking error $r(k)$, the backlash estimation error $\tilde{\tau}(k)$, and the NN weight estimation error $\tilde{W}(k)$ are UUB, provided the following conditions hold:

1) $0 < \alpha\sigma(k)^T\sigma(k) < \frac{1}{2}$, (33)

2) $0 < \Gamma < 1$, (34)

3) $0 < K_v < 1$ and $K_{vmax} < \frac{1}{\sqrt{\eta+2}}$, (35)

where $$\beta = K_v^{-1}(2I - K_v) + (1 - \alpha\sigma(k)^T\sigma(k))K_v^{-T}K_v^{-1} > 0. \quad (36)$$

$$\rho = (1 - \alpha\sigma(k)^T\sigma(k))I - \beta^{-1}(\alpha\sigma(k)^T\sigma(k) + \Gamma\|I - \alpha\sigma(k)\sigma(k)^T\|)^2 > 0. \quad (37)$$

$$\eta = (1 + \alpha\sigma(k)^T\sigma(k))I + \rho^{-1}(\alpha\sigma(k)^T\sigma(k) + \Gamma\|I - \alpha\sigma(k)\sigma(k)^T\|)^2 > 0. \quad (38)$$

Theorem Proof: See Appendix B.

Note that condition (36) is true because of (33) and (35). Note also that (38) is satisfied because of conditions (33) and (37). A proof for condition (37) is given in Appendix A.

Remarks

It is important to note that in this theorem, there is no certainty equivalence (CE) assumption, in contrast to standard work in discrete-time adaptive control. In the latter, a parameter identifier is first selected and the parameter estimation errors are assumed small. In the tracking proof, it is assumed that the parameter estimates are exact (the CE assumption), and a Lyapunov function is selected that weights only the tracking error to demonstrate close-loop stability and tracking performance. By contrast, in this disclosure, the Lyapunov function in Appendix B is of the form $$J(k) = \quad (B.4)$$
$$[r(k) + \tilde{\tau}(k)]^T \cdot [r(k) + \tilde{\tau}(k)] + r(k)^T r(k) + \frac{1}{\alpha}tr\{\tilde{W}(k)^T \cdot \tilde{W}(k)\} > 0,$$

which weights the tracking error $r(k)$, backlash estimation error $\tilde{\tau}(k)$ and the NN weight estimation error $\tilde{W}(k)$. This requires an exceedingly complex proof, but obviates the need for any sort of CE assumption. It also allows the parameter-tuning algorithm to be derived during the proof process, not selected a priori in an ad hoc manner.

The third term in (32) is a discrete-time version of Narendra's e-mod, which is required to provide robustness due to the coupling in the proof between tracking error, backlash error terms and weight estimation error terms in the Lyapunov function. This is called a 'forgetting term' in NN weight-tuning algorithms. These are required in that context to prevent parameter overtraining.

The following examples are included to demonstrate specific embodiments of the present disclosure. Those of skill in the art should, in light of the present disclosure, appreciate that many changes may be made in specific embodiments that are disclosed and still obtain a like or similar result without departing from the spirit and scope of the invention.

EXAMPLE 1

Simulation Results

In this section, a discrete-time NN backlash compensator according to an embodiment of this disclosure is simulated on a digital computer. It is found to be very efficient at canceling the deleterious effects of actuator backlash.

Simulation

We simulate the response for the known plant with input backlash, both with and without the NN compensator. Consider the following nonlinear plant $$x_1(k+1) = x_2(k),$$

$$x_2(k+1) = -\frac{3}{16}\left[\frac{x_1(k)}{1+x_1^2(k)}\right] + x_2(k) + u(k).$$

The deadband widths for the backlash nonlinearity were selected as $d_+ = d_- = 0.2$ and the slope as $m = 0.5$.

Trajectory Tracking

In this subsection we simulate the trajectory tracking performance of the system for sinusoidal reference signals.

The reference signal used was selected to be $$x_d(k)=\sin(w \cdot t_k+\phi),$$

$$w=0.5, \phi=\pi/2.$$

The sampling period was selected as T=0.001 s.

Figure 5:
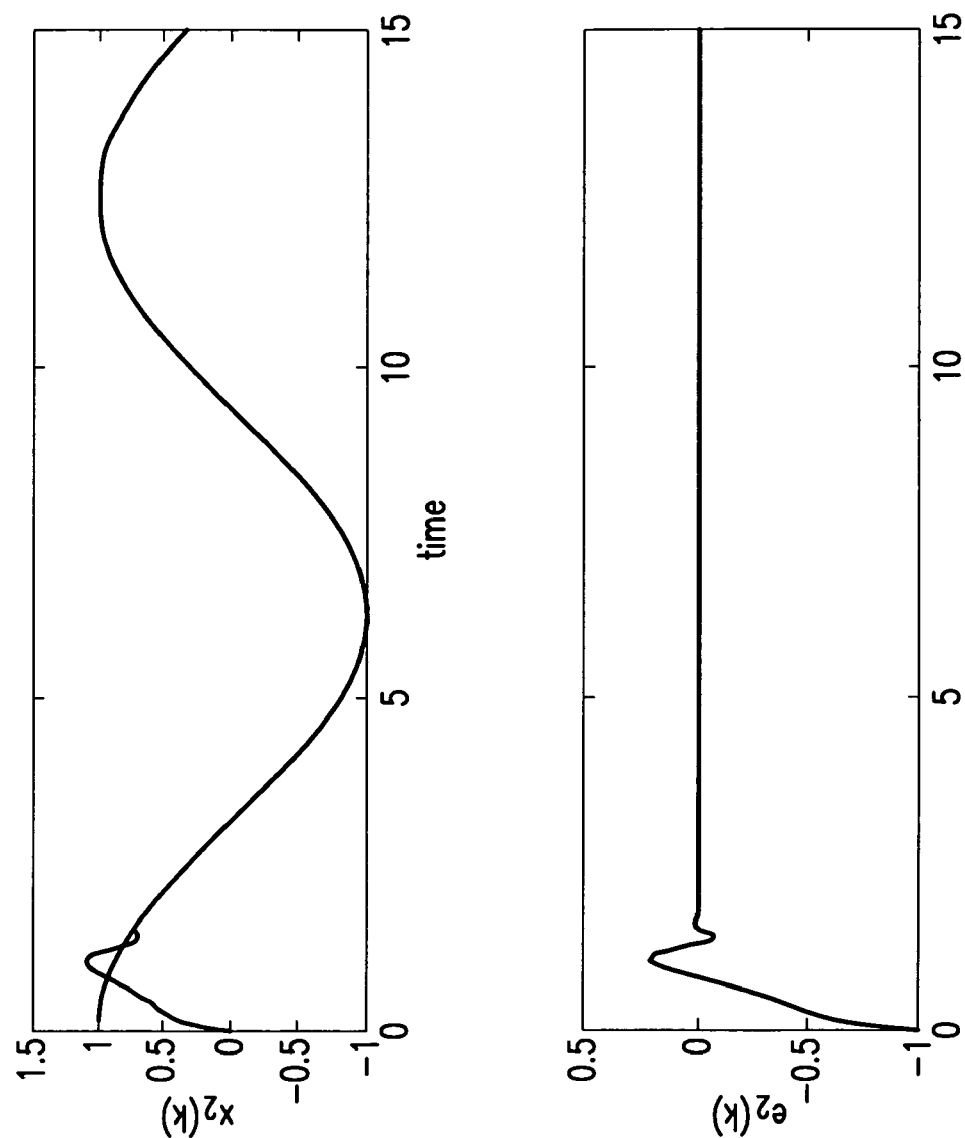
FIG. 5 illustrates data concerning a PD controller without backlash.
Figure 6:
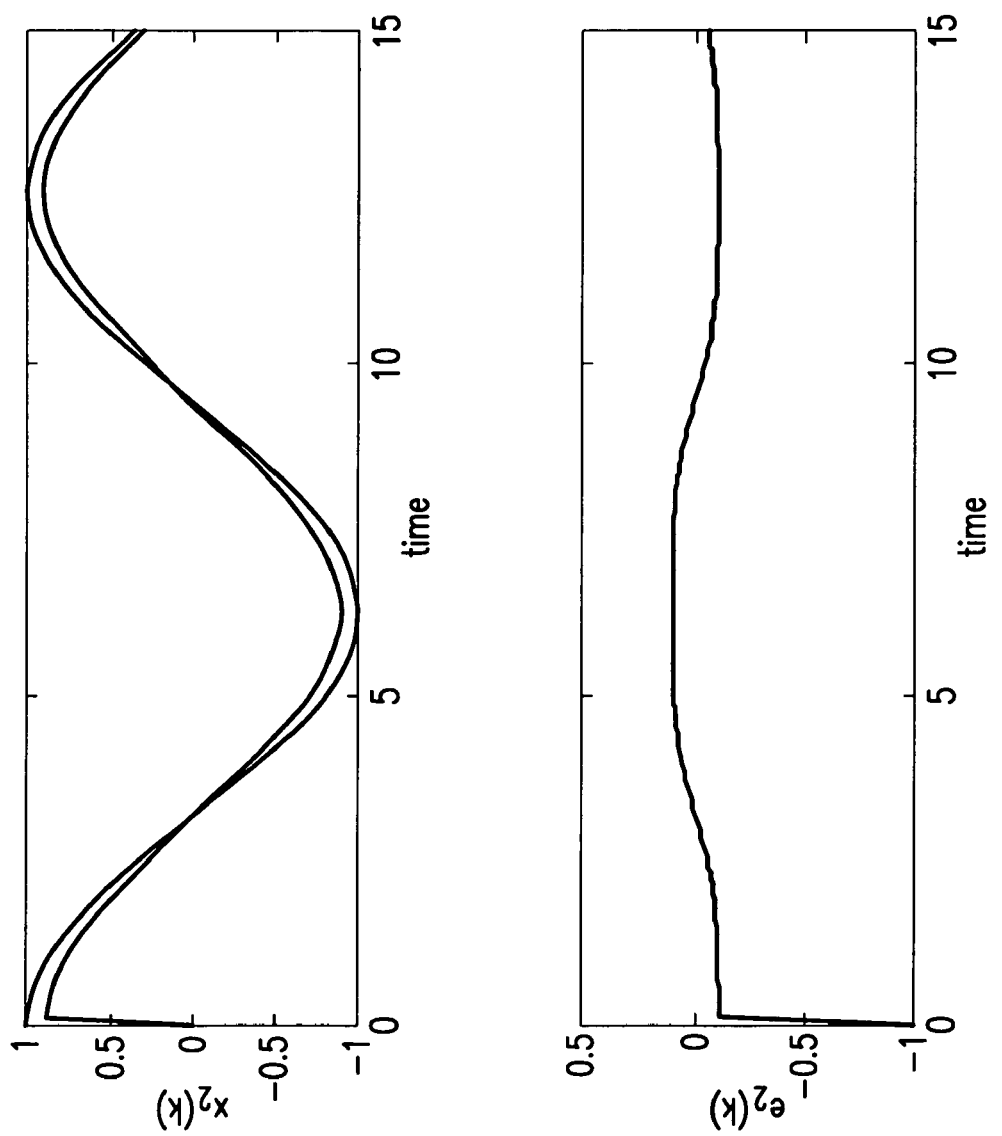
FIG. 6 illustrates data concerning a PD controller with backlash.
Figure 7:
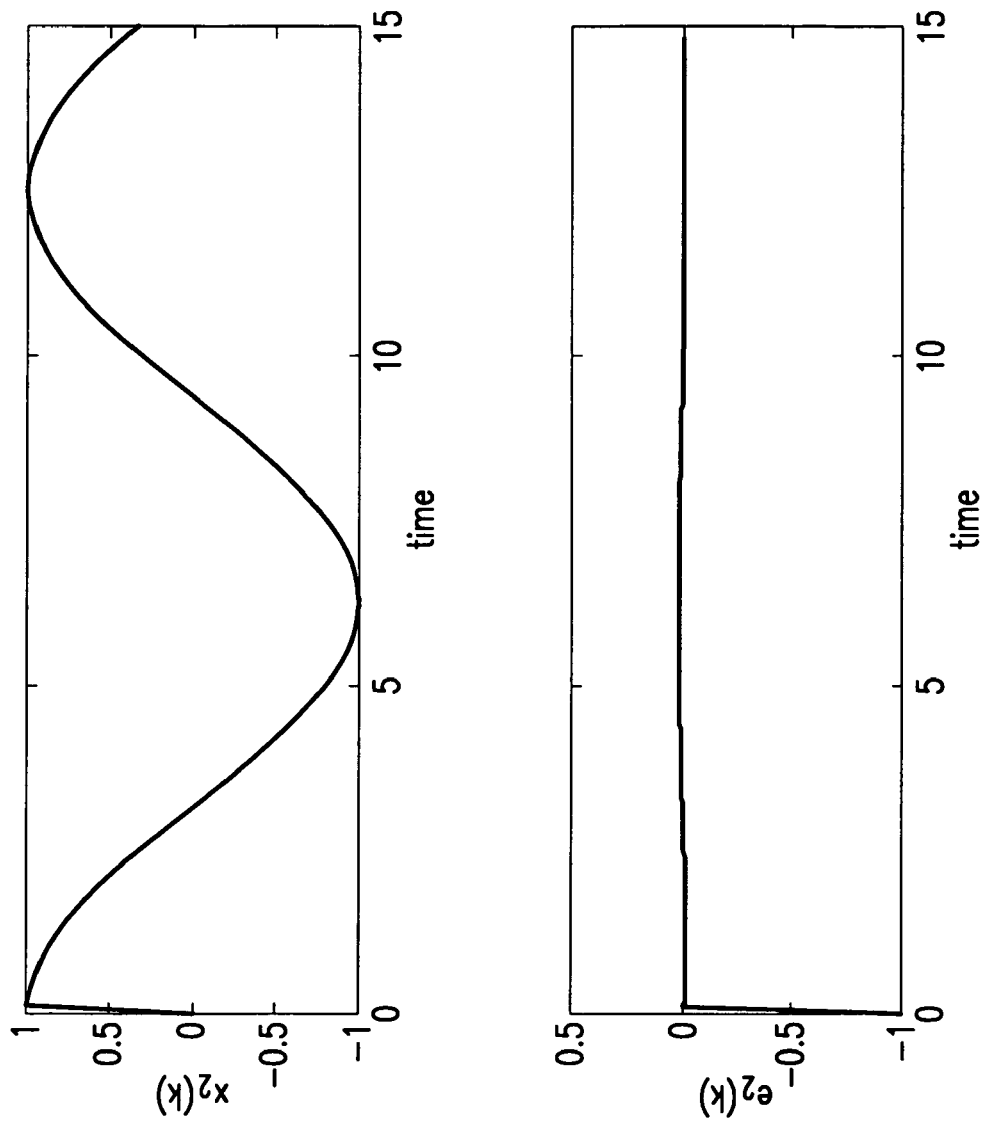
FIG. 7 illustrates data concerning a PD controller with backlash compensation according to one embodiment of the present disclosure.

FIG. 5 shows the system response without backlash using a standard PD controller. The PD controller does a good job on the tracking which is achieved at about 2 seconds. FIG. 6 shows the system response with input backlash. The system backlash destroys the tracking and the PD controller by itself is not capable of compensating for that. FIG. 7 shows the same situation but using the discrete-time NN backlash compensator of the present disclosure. The backlash compensator takes care of the system backlash and the tracking is achieved in less than 0.5 seconds.

Appendix A

Note: For simplicity purposes, in this appendix, the k sub-index is omitted. So, every variable has a k sub-index unless specified otherwise. This statement is valid only for the proofs shown in Appendices A and B.

Proof of Condition (37).

Because of condition (33), we have that $$(1 - \alpha \sigma^T \sigma)I > \frac{1}{2}I.$$

Also using (33), (34) we have that $$(\alpha \sigma^T \sigma + \Gamma \|I - \alpha \sigma \sigma^T\|)^2 < \frac{1}{4}I$$

Using (35) we have that $\beta > I$ (i.e., $\beta^{-1} < I$). Then we can conclude that $$\beta^{-1}(\alpha \sigma^T \sigma + \Gamma \|I - \alpha \sigma \sigma^T\|)^2 < \frac{1}{4}I.$$

Finally, using this last result we can show that $$\rho = (1 - \alpha \sigma^T \sigma)I - \beta^{-1}(\alpha \sigma^T \sigma + \Gamma \|I - \alpha \sigma \sigma^T\|)^2 > \frac{1}{4}I > 0.$$

Appendix B

Proof of Theorem 2

For simplicity purposes let us rewrite the system dynamics as $$r_{k+1}=K_v \cdot r+D-\tilde{\tau}. \quad (B.1)$$

where $D=\tilde{f}+d$. And let us rewrite the backlash dynamics as $$\tilde{\tau}_{k+1}=K_b\tilde{\tau}+\tilde{W}^T\sigma(V^T x_{nn})+\epsilon. \quad (B.2)$$

Select the Lyapunov function candidate $$L = [\, r^T \quad \tilde{\tau}^T \,] \begin{bmatrix} 2 & 1 \\ 1 & 1 \end{bmatrix} \begin{bmatrix} r \\ \tilde{\tau} \end{bmatrix} + \frac{1}{\alpha} tr(\tilde{W}^T \tilde{W}) > 0. \quad (B.3)$$

This can be rewritten as $$L = 2r^T r + 2r^T \tilde{\tau} + \tilde{\tau}^T \tilde{\tau} + \frac{1}{\alpha} tr(\tilde{W}^T \tilde{W}) = L_1 + L_2 + L_3 + L_4. \quad (B.4)$$

Taking the first difference $$\Delta L_1 = 2r_{k+1}^T r_{k+1} - 2r^T r = 2[K_v r + D - \tilde{\tau}]^T [K_v r + D - \tilde{\tau}] - 2r^T r =$$

$$= -2r^T[I - K_v^T K_v]r + 4r^T K_v^T D - 4r^T K_v^T \tilde{\tau} + 2D^T D - 4D^T \tilde{\tau} + 2\tilde{\tau}^T \tilde{\tau}.$$

$$\Delta L_2 = 2r_{k+1}^T \tilde{\tau}_{k+1} - 2r^T \tilde{\tau} = 2(K_v r + D - \tilde{\tau})^T (K_b \tilde{\tau} + \tilde{W}^T \sigma + \varepsilon) - 2r^T \tilde{\tau}$$

$$= 2r^T K_v^T K_b \tilde{\tau} + 2r^T K_v^T \tilde{W}^T \sigma + 2r^T K_v^T \varepsilon + 2D^T K_b \tilde{\tau} + 2D^T \tilde{W}^T \sigma + 2D^T \varepsilon - 2\tilde{\tau}^T K_b^T K_b \tilde{\tau} +$$

$$-2\tilde{\tau}^T \tilde{W}^T \sigma - 2\tilde{\tau}^T \varepsilon - 2r^T \tilde{\tau}.$$

$$\Delta L_3 = \tilde{\tau}_{k+1}^T \tilde{\tau}_{k+1} - \tilde{\tau}^T \tilde{\tau} = (K_b \tilde{\tau} + \tilde{W}^T \sigma + \varepsilon)^T (K_b \tilde{\tau} + \tilde{W}^T \sigma + \varepsilon) - \tilde{\tau}^T \tilde{\tau}$$

$$= \tilde{\tau}^T K_b^T K_b \tilde{\tau} + 2\tilde{\tau}^T K_b^T \tilde{W}^T \sigma + 2\tilde{\tau}^T K_b^T \varepsilon + \sigma^T \tilde{W} \tilde{W}^T \sigma + 2\varepsilon^T \tilde{W}^T \sigma + \varepsilon^T \varepsilon - \tilde{\tau}^T \tilde{\tau}.$$

$$\Delta L_4 = \frac{1}{\alpha} tr(\tilde{W}_{k+1}^T \tilde{W}_{k+1} - \tilde{W}^T \tilde{W}) = \frac{1}{\alpha} tr((W_{k+1} - \hat{W}_{k+1})^T (W_{k+1} - \hat{W}_{k+1}) (-\tilde{W}^T \tilde{W})$$

$$= \frac{1}{\alpha} tr(\hat{W}_{k+1}^T \hat{W}_{k+1} + W^T W - 2W^T \hat{W}_{k+1} - \tilde{W}^T \tilde{W}).$$

Select the tuning law $$\hat{W}_{k+1} = \hat{W} + \alpha\sigma \cdot r_{k+1}^T + \alpha\sigma \cdot \tilde{\tau}_{k+1}^T - \Gamma\|I - \alpha\cdot\sigma\cdot\sigma^T\|\hat{W}.$$

Then, $$\Delta L_4 = \frac{1}{\alpha}tr\{[\hat{W} + \alpha\sigma(r_{k+1}^T + \tilde{\tau}_{k+1}^T) - \Gamma\|I - \alpha\sigma\sigma^T\|\hat{W}]^T[\hat{W} + \alpha\sigma(r_{k+1}^T + \tilde{\tau}_{k+1}^T) - \Gamma\|I - \alpha\sigma\sigma^T\|\hat{W}] +$$
$$+ W^T W - \tilde{W}^T \tilde{W} - 2W^T[\hat{W} + \alpha\sigma(r_{k+1}^T + \tilde{\tau}_{k+1}^T) - \Gamma\|I - \alpha\sigma\sigma^T\|\hat{W}]\}.$$

$$= \frac{1}{\alpha}tr\{\hat{W}^T\hat{W} + 2\hat{W}^T\alpha\sigma \cdot r_{k+1}^T + 2\hat{W}^T\alpha\sigma \cdot \tilde{\tau}_{k+1}^T - 2\hat{W}^T\Gamma\|I - \alpha\sigma\cdot\sigma^T\|\hat{W} +$$
$$+ \alpha^2 r_{k+1}\sigma^T\sigma \cdot r_{k+1}^T + 2\alpha^2 r_{k+1}\sigma^T\sigma \cdot \tilde{\tau}_{k+1}^T - 2\alpha r_{k+1}\sigma^T\Gamma\|I - \alpha \cdot \sigma \cdot \sigma^T\|\hat{W} +$$
$$+ \alpha^2 \tilde{\tau}_{k+1}\sigma^T\sigma \cdot \tilde{\tau}_{k+1}^T - 2\alpha\tilde{\tau}_{k+1}\sigma^T\Gamma\|I - \alpha \cdot \sigma \cdot \sigma^T\|\hat{W} + \Gamma^2\|I - \alpha \cdot \sigma \cdot \sigma^T\|^2 \hat{W}^T\hat{W} + W^T W - \tilde{W}^T \tilde{W} +$$
$$- 2W^T\hat{W} - 2W^T\alpha\sigma \cdot r_{k+1}^T + 2W^T\alpha\sigma \cdot \tilde{\tau}_{k+1}^T + 2W^T\Gamma\|I - \alpha \cdot \sigma \cdot \sigma^T\|\hat{W}\}$$

$$= 2r_{k+1}^T\hat{W}^T\sigma + 2\tilde{\tau}_{k+1}^T\hat{W}^T\sigma + \alpha \cdot r_{k+1}^T\sigma^T\sigma r_{k+1} + 2\alpha\tilde{\tau}_{k+1}^T\sigma^T\sigma r_{k+1} +$$
$$- 2\Gamma\|I - \alpha \cdot \sigma\sigma^T\|r_{k+1}^T\hat{W}^T\sigma + \alpha\tilde{\tau}_{k+1}^T\sigma^T\sigma \cdot \tilde{\tau}_{k+1}^T - 2\Gamma\|I - \alpha \cdot \sigma\sigma^T\|\tilde{\tau}_{k+1}^T\hat{W}^T\sigma +$$
$$- 2r_{k+1}^T W^T\sigma - 2\tilde{\tau}_{k+1}^T W^T\sigma + \frac{1}{\alpha}tr\{\hat{W}^T\hat{W} - 2\Gamma\|I - \alpha \cdot \sigma \cdot \sigma^T\|\hat{W}^T\hat{W} + W^T W - \tilde{W}^T \tilde{W} +$$
$$- 2W^T W + \Gamma^2\|I - \alpha \cdot \sigma \cdot \sigma^T\|^2 \hat{W}^T\hat{W} + 2W^T\Gamma\|I - \alpha \cdot \sigma \cdot \sigma^T\|\hat{W}\}$$

$$= 2(r^T K_v^T + D^T - \tilde{\tau}^T)\hat{W}^T\sigma + 2(\tilde{\tau}^T K_b^T + \sigma^T \tilde{W} + \varepsilon^T)\hat{W}^T\sigma$$
$$+ \alpha \cdot (r^T K_v^T + D^T - \tilde{\tau}^T)\sigma^T\sigma(K_v r + D - \tilde{\tau}) +$$
$$+ 2\alpha(\tilde{\tau}^T K_b^T + \sigma^T \tilde{W} + \varepsilon^T)\sigma^T\sigma(K_v r + D - \tilde{\tau}) +$$
$$- 2\Gamma\|I - \alpha \cdot \sigma \cdot \sigma^T\|(r^T K_v^T + D^T - \tilde{\tau}^T)\hat{W}^T\sigma +$$
$$+ \alpha(\tilde{\tau}^T K_b^T + \sigma^T \tilde{W} + \varepsilon^T)\sigma^T\sigma \cdot (K_b\tilde{\tau} + \tilde{W}^T\sigma + \varepsilon) +$$
$$- 2\Gamma\|I - \alpha \cdot \sigma \cdot \sigma^T\|(\tilde{\tau}^T K_b^T + \sigma^T \tilde{W} + \varepsilon^T)\hat{W}^T\sigma - 2(r^T K_v^T + D^T - \tilde{\tau}^T)W^T\sigma +$$
$$- 2(\tilde{\tau}^T K_b^T + \sigma^T \tilde{W} + \varepsilon^T)W^T\sigma + \frac{1}{\alpha}tr\{-2\Gamma\|I - \alpha \cdot \sigma \cdot \sigma^T\|\hat{W}^T\hat{W} +$$
$$+ 2W^T\Gamma\|I - \alpha \cdot \sigma \cdot \sigma^T\|\hat{W} + \Gamma^2\|I - \alpha \cdot \sigma \cdot \sigma^T\|^2 \hat{W}^T\hat{W}\}$$

Combining all the terms $$\Delta L = -2r^T[I - K_v^T K_v]r + 4r^T K_v^T D - 4r^T K_v^T\tilde{\tau} + 2D^T D - 4D^T\tilde{\tau} + 2\tilde{\tau}^T\tilde{\tau} +$$
$$+ 2r^T K_v^T K_b\tilde{\tau} + 2r^T K_v^T \tilde{W}^T\sigma + 2r^T K_v^T\varepsilon + 2D^T K_b\tilde{\tau} + 2D^T \tilde{W}^T\sigma + 2D^T\varepsilon - 2\tilde{\tau}^T K_b^T K_b\tilde{\tau} +$$
$$- 2\tilde{\tau}^T \tilde{W}^T\sigma - 2\tilde{\tau}^T\varepsilon - 2r^T\tilde{\tau} +$$
$$\tilde{\tau}^T K_b^T K_b\tilde{\tau} + 2\tilde{\tau}^T K_b^T \tilde{W}^T\sigma + 2\tilde{\tau}^T K_b^T\varepsilon + \sigma^T \tilde{W} \tilde{W}^T\sigma + 2\varepsilon^T \tilde{W}^T\sigma + \varepsilon^T\varepsilon - \tilde{\tau}^T\tilde{\tau} +$$
$$+ 2(r^T K_v^T + D^T - \tilde{\tau}^T)\tilde{W}^T\sigma + 2(\tilde{\tau}^T K_b^T + \sigma^T \tilde{W} + \varepsilon^T)\hat{W}^T\sigma +$$
$$+ \alpha \cdot (r^T K_v^T + D^T - \tilde{\tau}^T)\sigma^T\sigma(K_v r + D - \tilde{\tau}) +$$
$$+ 2\alpha \cdot (\tilde{\tau}^T K_b^T + \sigma^T \tilde{W} + \varepsilon^T)\sigma^T\sigma(K_v r + D - \tilde{\tau}) +$$
$$- 2\Gamma\|I - \alpha \cdot \sigma \cdot \sigma^T\|(r^T K_v^T + D^T - \tilde{\tau}^T)\tilde{W}^T\sigma +$$
$$+ \alpha(\tilde{\tau}^T K_b^T + \sigma^T \tilde{W} + \varepsilon^T)\sigma^T\sigma \cdot (K_b\tilde{\tau} + \tilde{W}^T\sigma + \varepsilon) +$$
$$- 2\Gamma\|I - \alpha \cdot \sigma \cdot \sigma^T\|(\tilde{\tau}^T K_b^T + \sigma^T \tilde{W} + \varepsilon^T)\hat{W}^T\sigma - 2(r^T K_v^T + D^T - \tilde{\tau}^T)W^T\sigma +$$
$$- 2(\tilde{\tau}^T K_b^T + \sigma^T \tilde{W} + \varepsilon^T)W^T\sigma + \frac{1}{\alpha}tr\{-2\Gamma\|I - \alpha \cdot \sigma \cdot \sigma^T\|\hat{W}^T\hat{W} +$$
$$+ 2W^T\Gamma\|I - \alpha \cdot \sigma \cdot \sigma^T\|\hat{W} + \Gamma^2\|I - \alpha \cdot \sigma \cdot \sigma^T\|^2 \hat{W}^T\hat{W}\}$$

Simplifying $$\Delta L = -2r^T[I - K_v^T K_v]r + 4r^T K_v^T D - 4r^T K_v^T\tilde{\tau} + 2D^T D - 4D^T\tilde{\tau} + \tilde{\tau}^T\tilde{\tau} +$$
$$+ 2r^T K_v^T K_b\tilde{\tau} + 2r^T K_v^T \tilde{W}^T\sigma + 2r^T K_v^T\varepsilon + 2D^T K_b\tilde{\tau} + 2D^T \tilde{W}^T\sigma + 2D^T\varepsilon - \tilde{\tau}^T K_b^T K_b\tilde{\tau} +$$
$$- 2\tilde{\tau}^T \tilde{W}^T\sigma - 2\tilde{\tau}^T\varepsilon - 2r^T\tilde{\tau} + 2\tilde{\tau}^T K_b^T \tilde{W}^T\sigma + 2\tilde{\tau}^T K_b^T\varepsilon + \sigma^T \tilde{W} \tilde{W}^T\sigma + 2\varepsilon^T \tilde{W}^T\sigma + \varepsilon^T\varepsilon +$$

-continued $$-2(r^T K_v^T + D^T - \tilde{\tau}^T)\tilde{W}^T\sigma - 2(\tilde{\tau}^T K_b^T + \sigma^T \tilde{W} + \varepsilon^T)\tilde{W}^T\sigma +$$

$$+\alpha \cdot (r^T K_v^T + D^T - \tilde{\tau}^T)\sigma^T\sigma(K_v r + D - \tilde{\tau}) + 2\alpha(\tilde{\tau}^T K_b^T + \sigma^T \tilde{W} + \varepsilon^T)\sigma^T\sigma(K_v r + D - \tilde{\tau}) +$$

$$-2\Gamma\|I - \alpha\sigma\sigma^T\|(r^T K_v^T + D^T - \tilde{\tau}^T)(W - \hat{W})^T\sigma + \alpha(\tilde{\tau}^T K_b^T + \sigma^T \tilde{W} + \varepsilon^T)\sigma^T\sigma(K_b \tilde{\tau} + \tilde{W}^T\sigma + \varepsilon) +$$

$$-2\Gamma\|I - \alpha\cdot\sigma\cdot\sigma^T\|(\tilde{\tau}^T K_b^T + \sigma^T \tilde{W} + \varepsilon^T)(W - \hat{W})^T\sigma + \frac{1}{\alpha}\text{tr}\{-2\Gamma\|I - \alpha\cdot\sigma\cdot\sigma^T\|\hat{W}^T\hat{W} +$$

$$+2W^T\Gamma\|I - \alpha\cdot\sigma\cdot\sigma^T\|\hat{W} + \Gamma^2\|I - \alpha\cdot\sigma\cdot\sigma^T\|^2\hat{W}^T\hat{W}\}$$

Multiplying out terms $$\Delta L = -2r^T[I - K_v^T K_v]r + 4r^T K_v^T D - 4r^T K_v^T \tilde{\tau} + 2D^T D - 4D^T \tilde{\tau} + \tilde{\tau}^T \tilde{\tau} +$$

$$2r^T K_v^T K_b \tilde{\tau} + 2r^T K_v^T \tilde{W}^T\sigma + 2r^T K_v^T \varepsilon + 2D^T K_b \tilde{\tau} + 2D^T \tilde{W}^T\sigma + 2D^T \varepsilon - \tilde{\tau}^T K_b^T K_b \tilde{\tau} +$$

$$-2\tilde{\tau}^T \tilde{W}^T\sigma - 2\tilde{\tau}^T \varepsilon - 2r^T \tilde{\tau} + 2\tilde{\tau}^T K_b^T \tilde{W}^T\sigma + 2\tilde{\tau}^T K_b^T \varepsilon + \sigma^T \tilde{W} \tilde{W}^T\sigma + 2\varepsilon^T \tilde{W}^T\sigma + \varepsilon^T \varepsilon +$$

$$-2r^T K_v^T \tilde{W}^T\sigma - 2D^T \tilde{W}^T\sigma + 2\tilde{\tau}^T \tilde{W}^T\sigma - 2\tilde{\tau}^T K_b^T \tilde{W}^T\sigma - 2\sigma^T \tilde{W} \tilde{W}^T\sigma - 2\varepsilon^T \tilde{W}^T\sigma +$$

$$+\alpha r^T K_v^T \sigma^T\sigma K_v r + 2\alpha r^T K_v^T \sigma^T\sigma D - 2\alpha r^T K_v^T \sigma^T\sigma\tilde{\tau} + \alpha D^T\sigma^T\sigma D - 2\alpha D^T\sigma^T\sigma\tilde{\tau} +$$

$$+\alpha \tilde{\tau}^T\sigma^T\sigma\tilde{\tau} + 2\alpha \tilde{\tau}^T K_b^T \sigma^T\sigma K_v r + 2\alpha \tilde{\tau}^T K_b^T \sigma^T\sigma D - 2\alpha \tilde{\tau}^T K_b^T \sigma^T\sigma\tilde{\tau} +$$

$$+2\alpha\sigma^T \tilde{W}\sigma^T\sigma K_v r + 2\alpha\sigma^T \tilde{W}\sigma^T\sigma D - 2\alpha \tilde{\tau}^T \tilde{W}\sigma^T\sigma\tilde{\tau} + 2\alpha\varepsilon^T\sigma^T\sigma K_v r + 2\alpha\varepsilon^T\sigma^T\sigma D +$$

$$-2\alpha\varepsilon^T\sigma^T\sigma\tilde{\tau} - 2\Gamma\|I - \alpha\cdot\sigma\cdot\sigma^T\|r^T K_v^T W^T\sigma + 2\Gamma\|I - \alpha\cdot\sigma\cdot\sigma^T\|r^T K_v^T \tilde{W}^T\sigma +$$

$$-2\Gamma\|I - \alpha\cdot\sigma\cdot\sigma^T\|D^T W^T\sigma + 2\Gamma\|I - \alpha\cdot\sigma\cdot\sigma^T\|D^T \tilde{W}^T\sigma + 2\Gamma\|I - \alpha\cdot\sigma\cdot\sigma^T\|\tilde{\tau}^T W^T\sigma +$$

$$-2\Gamma\|I - \alpha\cdot\sigma\cdot\sigma^T\|\tilde{\tau}^T \tilde{W}^T\sigma + \alpha\tilde{\tau}^T K_b^T\sigma^T\sigma K_b\tilde{\tau} + 2\alpha\tilde{\tau}^T K_b^T\sigma^T\sigma \tilde{W}^T\sigma + 2\alpha\tilde{\tau}^T K_b^T\sigma^T\sigma\varepsilon +$$

$$+\alpha\sigma^T \tilde{W}\sigma^T\sigma \tilde{W}^T\sigma + 2\alpha\tau^T \tilde{W}\sigma^T\sigma\varepsilon + \alpha\varepsilon^T\sigma^T\sigma\cdot\varepsilon - 2\Gamma\|I - \alpha\cdot\sigma\cdot\sigma^T\|\tilde{\tau}^T K_b^T W^T\sigma +$$

$$+2\Gamma\|I - \alpha\cdot\sigma\cdot\sigma^T\|\tilde{\tau}^T K_b^T \tilde{W}^T\sigma - 2\Gamma\|I - \alpha\cdot\sigma\cdot\sigma^T\|\sigma^T \tilde{W}\hat{W}^T\sigma - 2\Gamma\|I - \alpha\cdot\sigma\cdot\sigma^T\|\varepsilon^T W^T\sigma +$$

$$+2\Gamma\|I - \alpha\cdot\sigma\cdot\sigma^T\|\varepsilon^T \tilde{W}^T\sigma + \frac{1}{\alpha}\text{tr}\{-2\Gamma\|I - \alpha\cdot\sigma\cdot\sigma^T\|\hat{W}^T\hat{W} +$$

$$+2W^T\Gamma\|I - \alpha\cdot\sigma\cdot\sigma^T\|\hat{W} + \Gamma^2\|I - \alpha\cdot\sigma\cdot\sigma^T\|^2\hat{W}^T\hat{W}\}$$

Simplifying $$\Delta L = -r^T[2I - (2 + \alpha\sigma^T\sigma)K_v^T K_v]r + 2(2 + \alpha\sigma^T\sigma)r^T K_v^T D + (2 + \alpha\sigma^T\sigma)D^T D +$$

$$+2(1 + \alpha\sigma^T\sigma)r^T K_v^T \varepsilon + (1 + \alpha\sigma^T\sigma)\varepsilon^T\varepsilon + 2(1 + \alpha\sigma^T\sigma)\varepsilon^T D +$$

$$+\tilde{\tau}^T\tilde{\tau} - \tilde{\tau}^T K_b^T K_b\tilde{\tau} + \alpha\tilde{\tau}^T K_b^T\sigma^T\sigma K_b\tilde{\tau} + \alpha\tilde{\tau}^T\sigma^T\sigma\tilde{\tau} - 2\alpha\tilde{\tau}^T K_b^T\sigma^T\sigma\tilde{\tau} + 2(1 + \alpha\sigma^T\sigma)r^T K_v^T K_b\tilde{\tau} +$$

$$-2r^T\tilde{\tau} + 2(1 + \alpha\sigma^T\sigma)D^T K_b\tilde{\tau} - 2(1 + \alpha\sigma^T\sigma)\tilde{\tau}^T\varepsilon - 2(2 + \alpha\sigma^T\sigma)r^T K_v^T\tilde{\tau} - 2\alpha\sigma^T \tilde{W}\sigma^T\sigma\tilde{\tau} +$$

$$-2(2 + \alpha\sigma^T\sigma)D^T\tilde{\tau} + 2\alpha\tilde{\tau}^T K_b^T\sigma^T\sigma \tilde{W}^T\sigma + 2(1 + \alpha\sigma^T\sigma)\tilde{\tau}^T K_b^T\varepsilon +$$

$$+2\alpha\sigma^T\sigma r^T K_v^T \tilde{W}^T\sigma - (1 - \alpha\sigma^T\sigma)\sigma^T \tilde{W}\tilde{W}^T\sigma + 2\alpha\sigma^T\sigma\varepsilon^T \tilde{W}^T\sigma +$$

$$+2\alpha\sigma^T \tilde{W}^T\sigma D + 2\Gamma\|I - \alpha\cdot\sigma\cdot\sigma^T\|D^T \tilde{W}^T\sigma + 2\Gamma\|I - \alpha\cdot\sigma\cdot\sigma^T\|r^T K_v^T \tilde{W}^T\sigma +$$

$$-2\Gamma\|I - \alpha\cdot\sigma\cdot\sigma^T\|r^T K_v^T W^T\sigma - 2\Gamma\|I - \alpha\cdot\sigma\cdot\sigma^T\|D^T W^T\sigma + 2\Gamma\|I - \alpha\cdot\sigma\cdot\sigma^T\|\varepsilon^T \tilde{W}^T\sigma +$$

$$-2\Gamma\|I - \alpha\cdot\sigma\cdot\sigma^T\|\varepsilon^T W^T\sigma - 2\Gamma\|I - \alpha\cdot\sigma\cdot\sigma^T\|\tilde{\tau}^T K_b^T W^T\sigma + 2\Gamma\|I - \alpha\cdot\sigma\cdot\sigma^T\|\tilde{\tau}^T K_b^T \tilde{W}^T\sigma +$$

$$+2\Gamma\|I - \alpha\cdot\sigma\cdot\sigma^T\|\tilde{\tau}^T W^T\sigma - 2\Gamma\|I - \alpha\cdot\sigma\cdot\sigma^T\|\tilde{\tau}^T \tilde{W}^T\sigma - 2\Gamma\|I - \alpha\cdot\sigma\cdot\sigma^T\|\sigma^T \tilde{W}\hat{W}^T\sigma +$$

$$+\frac{1}{\alpha}\text{tr}\{-2\Gamma\|I - \alpha\cdot\sigma\cdot\sigma^T\|\hat{W}^T\hat{W} + 2W^T\Gamma\|I - \alpha\cdot\sigma\cdot\sigma^T\|\hat{W} + \Gamma^2\|I - \alpha\cdot\sigma\cdot\sigma^T\|^2\hat{W}^T\hat{W}\}$$

Pick $K_b = (I + K_v^{-1})^T = I + K_a$ and define $\beta = 2K_a + (1 - \alpha\sigma^T\sigma)$ $K_a^T K_a - I > 0$ (condition (36)) which is true as long as $K_v^{-1} < I$ (condition (35)).

It can be seen that $\beta > I$ and $\beta$ is a diagonal matrix since $K_a$ is diagonal.

$$\Delta L = -r^T[2I - (2 + \alpha\sigma^T\sigma)K_v^T K_v]r + 2(2 + \alpha\sigma^T\sigma)r^T K_v^T D + (2 + \alpha\sigma^T\sigma)D^T D +$$

$$+2(1 + \alpha\sigma^T\sigma)r^T K_v^T \varepsilon + (1 + \alpha\sigma^T\sigma)\varepsilon^T\varepsilon + 2(1 + \alpha\sigma^T\sigma)\varepsilon^T D +$$

-continued $$-(\beta+I)\tilde{\tau}^T\tilde{\tau}+2(1+\alpha\sigma^T\sigma)r^T K_v^T(I+K_a)\tilde{\tau}-2r^T\tilde{\tau}+2(1+\alpha\sigma^T\sigma)D^T(I+K_a)\tilde{\tau}+$$

$$-2(1+\alpha\sigma^T\sigma)\tilde{\tau}^T\varepsilon-2(2+\alpha\sigma^T\sigma)r^T K_v^T\tilde{\tau}-2\alpha\sigma^T\tilde{W}\sigma^T\sigma\tilde{\tau}-2(2+\alpha\sigma^T\sigma)D^T\tilde{\tau}+$$

$$+2\alpha\tilde{\tau}^T(I+K_a^T)\sigma^T\sigma\tilde{W}^T\sigma+2(1+\alpha\sigma^T\sigma)\tilde{\tau}^T(I+K_a^T)\varepsilon+$$

$$+2\alpha\sigma^T\sigma r^T K_v^T\tilde{W}^T\sigma-(1-\alpha\sigma^T\sigma)\sigma^T\tilde{W}\tilde{W}^T\sigma+2\alpha\sigma^T\sigma\varepsilon^T\tilde{W}^T\sigma+$$

$$+2\alpha\sigma^T\tilde{W}\sigma^T\sigma D+2\Gamma\|I-\alpha\cdot\sigma\cdot\sigma^T\|D^T\tilde{W}^T\sigma+2\Gamma\|I-\alpha\cdot\sigma\cdot\sigma^T\|r^T K_v^T\tilde{W}^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|D^T W^T\sigma+2\Gamma\|I-\alpha\cdot\sigma\cdot\sigma^T\|\varepsilon^T\tilde{W}^T\sigma+$$

$$-2\Gamma\|I-\alpha\cdot\sigma\cdot\sigma^T\|\varepsilon^T W^T\sigma-2\Gamma\|I-\alpha\cdot\sigma\cdot\sigma^T\|\sigma^T\tilde{W}\hat{W}^T\sigma-2\Gamma\|I-\alpha\cdot\sigma\cdot\sigma^T\|\tilde{\tau}^T(I+K_a^T)W^T\sigma+$$

$$+2\Gamma\|I-\alpha\cdot\sigma\cdot\sigma^T\|\tilde{\tau}^T(I+K_a^T)\tilde{W}^T\sigma+2\Gamma\|I-\alpha\cdot\sigma\cdot\sigma^T\|\tilde{\tau}^T W^T\sigma-2\Gamma\|I-\alpha\cdot\sigma\cdot\sigma^T\|\tilde{\tau}^T\tilde{W}^T\sigma+$$

$$\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

$$\Delta L=-r^T[2I-(2+\alpha\sigma^T\sigma)K_v^T K_v]r+2(2+\alpha\sigma^T\sigma)r^T K_v^T D+(2+\alpha\sigma^T\sigma)D^T D+$$

$$+2(1+\alpha\sigma^T\sigma)r^T K_v^T\varepsilon+(1+\alpha\sigma^T\sigma)\varepsilon^T\varepsilon+2(1+\alpha\sigma^T\sigma)\varepsilon^T D+$$

$$-(I+\beta)\tilde{\tau}^T\tau 2r^T K_v^T\tilde{\tau}+2\alpha\sigma^T\sigma r^T\tilde{\tau}+2(1+\alpha\sigma^T\sigma)D^T K_a\tilde{\tau}-2D^T\tilde{\tau}+$$

$$2\alpha\tilde{\tau}^T K_a^T\sigma^T\sigma\tilde{W}^T\sigma+2(1+\alpha\sigma^T\sigma)\tilde{\tau}^T K_a-2\Gamma\|I-\alpha\cdot\sigma\cdot\sigma^T\|\tilde{\tau}^T K_a^T W^T\sigma+$$

$$2\Gamma\|I-\alpha\cdot\sigma\cdot\sigma^T\|\tilde{\tau}^T K_a^T\tilde{W}^T\sigma+$$

$$+2\alpha\sigma^T\sigma r^T K_v^T\tilde{W}^T\sigma-(1-\alpha\sigma^T\sigma)\sigma^T\tilde{W}\tilde{W}^T\sigma+2\alpha\sigma^T\sigma\varepsilon^T\tilde{W}^T\sigma+$$

$$+2\alpha\sigma^T\tilde{W}\sigma^T\sigma D+2\Gamma\|I-\alpha\cdot\sigma\cdot\sigma^T\|D^T\tilde{W}^T\sigma+2\Gamma\|I-\alpha\cdot\sigma\cdot\sigma^T\|r^T K_v^T\tilde{W}^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|D^T W^T\sigma+2\Gamma\|I-\alpha\cdot\sigma\cdot\sigma^T\|\varepsilon^T\tilde{W}^T\sigma+$$

$$-2\Gamma\|I-\alpha\cdot\sigma\cdot\sigma^T\|\varepsilon^T W^T\sigma-2\Gamma\|I-\alpha\cdot\sigma\cdot\sigma^T\|\sigma^T\tilde{W}\hat{W}^T\sigma+$$

$$+\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

Completing squares for $K_a\tilde{\tau}$ and $\tilde{\tau}$ $$\Delta L=-r^T[2I-(2+\alpha\sigma^T\sigma)K_v^T K_v]r+2(2+\alpha\sigma^T\sigma)r^T K_v^T D+(2+\alpha\sigma^T\sigma)D^T D+$$

$$+2(1+\alpha\sigma^T\sigma)r^T K_v^T\varepsilon+(1+\alpha\sigma^T\sigma)\varepsilon^T\varepsilon+2(1+\alpha\sigma^T\sigma)\varepsilon^T D+$$

$$-\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}^T\cdot\beta\cdot$$

$$\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}+$$

$$+\{\beta^{-1}[(1+\alpha\sigma^T\sigma)(D+\varepsilon)+(\alpha\sigma^T\sigma+\Gamma\|I-\alpha\sigma\sigma^T\|)\tilde{W}^T\sigma-\Gamma\|I-\alpha\sigma\sigma^T\|W^T\sigma]\}^T\cdot\beta\cdot$$

$$\{\beta^{-1}[(1+\alpha\sigma^T\sigma)(D+\varepsilon)+(\alpha\sigma^T\sigma+\Gamma\|I-\alpha\sigma\sigma^T\|)\tilde{W}^T\sigma-\Gamma\|I-\alpha\sigma\sigma^T\|W^T\sigma]\}+$$

$$-[\tilde{\tau}-\alpha\sigma^T\sigma r+D+K_v r]^T[\tilde{\tau}-\alpha\sigma^T\sigma r+D+K_v r]+(\alpha\sigma^T\sigma)^2 r^T r+r^T K_v^T K_v r+D^T D+$$

$$-2\alpha\sigma^T\sigma r^T D+2r^T K_v^T D-2\alpha\sigma^T\sigma r^T K_v r+$$

$$+2\alpha\sigma^T\sigma r^T K_v^T\tilde{W}^T\sigma-(1-\alpha\sigma^T\sigma)\sigma^T\tilde{W}\tilde{W}^T\sigma+2\alpha\sigma^T\sigma\varepsilon^T\tilde{W}^T\sigma+$$

$$+2\alpha\sigma^T\tilde{W}\sigma^T\sigma D+2\Gamma\|I-\alpha\cdot\sigma\cdot\sigma^T\|D^T\tilde{W}^T\sigma+2\Gamma\|I-\alpha\cdot\sigma\cdot\sigma^T\|r^T K_v^T\tilde{W}^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|D^T W^T\sigma+2\Gamma\|I-\alpha\cdot\sigma\cdot\sigma^T\|\varepsilon^T\tilde{W}^T\sigma+$$

$$-2\Gamma\|I-\alpha\cdot\sigma\cdot\sigma^T\|\varepsilon^T W^T\sigma-2\Gamma\|I-\alpha\cdot\sigma\cdot\sigma^T\|\sigma^T\tilde{W}\hat{W}^T\sigma+$$

$$+\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

$$\Delta L=-r^T[2I-(3+\alpha\sigma^T\sigma)K_v^T K_v]-(\alpha\sigma^T\sigma)^2+2\alpha\sigma^T\sigma K_v]r+2(3+\alpha\sigma^T\sigma)r^T K_v^T D+$$

$$+(3+\alpha\sigma^T\sigma)D^T D+2(1+\alpha\sigma^T\sigma)r^T K_v^T\varepsilon+(1+\alpha\sigma^T\sigma)\varepsilon^T\varepsilon+2(1+\alpha\sigma^T\sigma)\varepsilon^T D+$$

$$-\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}^T\cdot\beta\cdot$$

$$\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}+$$

$$-[\tilde{\tau}-\alpha\sigma^T\sigma r+D+K_v r]^T[\tilde{\tau}-\alpha\sigma^T\sigma r+D+K_v r]+\beta^{-1}(1+\alpha\sigma^T\sigma)^2(D+\varepsilon)^2(D+\varepsilon)+$$

$$-2\alpha\sigma^T\sigma r^T D+$$

-continued $$+2\beta^{-1}(\alpha\sigma^T\sigma+\Gamma\|I-\alpha\sigma\sigma^T\|)(1+\alpha\sigma^T\sigma)(D+\varepsilon)^T\tilde{W}^T\sigma+\beta^{-1}(\alpha\sigma^T\sigma+\Gamma\|I-\alpha\sigma\sigma^T\|)^2\sigma^T\tilde{W}\tilde{W}^T\sigma+$$

$$+\beta^{-1}\Gamma^2\|I-\alpha\sigma\sigma^T\|^2\sigma^T WW^T\sigma-2\beta^{-1}(1+\alpha\sigma^T\sigma)\Gamma\|I-\alpha\sigma\sigma^T\|(D+\varepsilon)^T W^T\sigma+$$

$$-2\beta^{-1}(\alpha\sigma^T\sigma+\Gamma\|I-\alpha\sigma\sigma^T\|)\Gamma\|I-\alpha\sigma\sigma^T\|\sigma^T\tilde{W}W^T\sigma+$$

$$+2\alpha\sigma^T\sigma r^T K_v^T\tilde{W}^T\sigma-(1-\alpha\sigma^T\sigma)\sigma^T\tilde{W}\tilde{W}^T\sigma+2\alpha\sigma^T\sigma\varepsilon^T\tilde{W}^T\sigma+$$

$$+2\alpha\sigma^T\tilde{W}\sigma^T\sigma D+2\Gamma\|I-\alpha\cdot\sigma\cdot\sigma^T\|D^T\tilde{W}^T\sigma+2\Gamma\|I-\alpha\cdot\sigma\cdot\sigma^T\|r^T K_v^T\tilde{W}^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|D^T W^T\sigma+2\Gamma\|I-\alpha\cdot\sigma\cdot\sigma^T\|\varepsilon^T\tilde{W}^T\sigma+$$

$$-2\Gamma\|I-\alpha\cdot\sigma\cdot\sigma^T\|\varepsilon^T W^T\sigma-2\Gamma\|I-\alpha\cdot\sigma\cdot\sigma^T\|\sigma^T\tilde{W}\hat{W}^T\sigma+$$

$$+\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

$$\Delta L=-r^T[2I-(3+\alpha\sigma^T\sigma)K_v^T K_v-(\alpha\sigma^T\sigma)^2+2\alpha\sigma^T\sigma K_v]r+2(1+\alpha\sigma^T\sigma)r^T K_v^T(D+\varepsilon)+$$

$$4r^T K_v^T D+2D^T D+$$

$$-\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}^T\cdot\beta\cdot$$

$$\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}-2\alpha\sigma^T\sigma r^T D+$$

$$-[\tilde{\tau}-\alpha\sigma^T\sigma r+D+K_v r]^T[\tilde{\tau}-\alpha\sigma^T\sigma r+D+K_v r]+(1+\alpha\sigma^T\sigma)[1+\beta^{-1}(1+\alpha\sigma^T\sigma)](D+\varepsilon)^T(D+\varepsilon)+$$

$$2(\alpha\sigma^T\sigma+\Gamma\|I-\alpha\sigma\sigma^T\|)r^T K_v^T\tilde{W}^T\sigma-[1-\alpha\sigma^T\sigma-\beta^{-1}(\alpha\sigma^T\sigma+\Gamma\|I-\alpha\sigma\sigma^T\|)^2]\sigma^T\tilde{W}\tilde{W}^T\sigma+$$

$$+\beta^{-1}\Gamma^2\|I-\alpha\sigma\sigma^T\|^2\sigma^T WW^T\sigma-2\beta^{-1}(1+\alpha\sigma^T\sigma)\Gamma\|I-\alpha\sigma\sigma^T\|(D+\varepsilon)^T W^T\sigma+$$

$$-2\beta^{-1}(\alpha\sigma^T\sigma+\Gamma\|I-\alpha\sigma\sigma^T\|)\Gamma\|I-\alpha\sigma\sigma^T\|\sigma^T\tilde{W}W^T\sigma+$$

$$+2(\alpha\sigma^T\sigma+\Gamma\|I-\alpha\sigma\sigma^T\|)[1+\beta^{-1}(1+\alpha\sigma^T\sigma)](D+\varepsilon)^T\tilde{W}^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|(D+\varepsilon)^T W^T\sigma-2\Gamma\|I-\alpha\cdot\sigma\cdot\sigma^T\|\sigma^T\tilde{W}\hat{W}^T\sigma+$$

$$+\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

Define $\rho=(1-\alpha\sigma^T\sigma)I-\beta^{-1}(\alpha\sigma^T\sigma+\Gamma\|I-\alpha\sigma\sigma^T\|)^2>0$ (condition (36)).

Completing squares for $\tilde{W}^T\sigma$ $$\Delta L=-r^T[2I-(3+\alpha\sigma^T\sigma)K_v^T K_v]-(\alpha\sigma^T\sigma)^2+2\alpha\sigma^T\sigma K_v]r+2(1+\alpha\sigma^T\sigma)r^T K_v^T(D+\varepsilon)+$$

$$+4r^T K_v^T D+2D^T D+$$

$$-\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}^T\cdot\beta\cdot$$

$$\{K_a\tilde{\tau}-\beta^{-1}[(1+\alpha\sigma^T\sigma)(D+\varepsilon)-(\alpha\sigma^T\sigma+\Gamma\|I-\alpha\sigma\sigma^T\|)\tilde{W}^T\sigma+\Gamma\|I-\alpha\sigma\sigma^T\|W^T\sigma]\}+$$

$$-[\tilde{\tau}-\alpha\sigma^T\sigma r+D+K_v r]^T[\tilde{\tau}-\alpha\sigma^T\sigma r+D+K_v r]-2\alpha\sigma^T\sigma r^T D+$$

$$+(1+\alpha\sigma^T\sigma)\left(1+\frac{1+\alpha\sigma^T\sigma}{\beta}\right)(D+\varepsilon)^T(D+\varepsilon)+$$

$$-\{\tilde{W}^T\sigma-\rho^{-1}(\alpha\sigma^T\sigma+\Gamma\|I-\alpha\sigma\sigma^T\|)[K_v r+(1+\beta^{-1}(1+\alpha\sigma^T\sigma))(D+\varepsilon)-\beta^{-1}\Gamma\|I-\alpha\sigma\sigma^T\|W^T\sigma]\}^T\rho$$

$$\{\tilde{W}^T\sigma-\rho^{-1}(\alpha\sigma^T\sigma+\Gamma\|I-\alpha\sigma\sigma^T\|)[K_v r+(1+\beta^{-1}(1+\alpha\sigma^T\sigma))(D+\varepsilon)-\beta^{-1}\Gamma\|I-\alpha\sigma\sigma^T\|W^T\sigma]\}$$

$$+\rho^{-1}(\alpha\sigma^T\sigma+\Gamma\|I-\alpha\sigma\sigma^T\|)^2[K_v r+(1+\beta^{-1}(1+\alpha\sigma^T\sigma))(D+\varepsilon)-\beta^{-1}\Gamma\|I-\alpha\sigma\sigma^T\|W^T\sigma]^T$$

$$[K_v r+(1+\beta^{-1}(1+\alpha\sigma^T\sigma))(D+\varepsilon)-\beta^{-1}\Gamma\|I-\alpha\sigma\sigma^T\|W^T\sigma]+$$

$$+\beta^{-1}\Gamma^2\|I-\alpha\sigma\sigma^T\|^2\sigma^T WW^T\sigma-2\beta^{-1}(1+\alpha\sigma^T\sigma)\Gamma\|I-\alpha\sigma\sigma^T\|(D+\varepsilon)^T W^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|(D+\varepsilon)^T W^T\sigma+$$

$$-2\Gamma\|I-\alpha\cdot\sigma\cdot\sigma^T\|\sigma^T\tilde{W}\hat{W}^T\sigma+$$

$$+\frac{1}{\alpha}tr\{-2\Gamma\|I-\alpha\cdot\sigma\cdot\sigma^T\|\hat{W}^T\hat{W}+2W^T\Gamma\|I-\alpha\cdot\sigma\cdot\sigma^T\|\hat{W}+\Gamma^2\|I-\alpha\cdot\sigma\cdot\sigma^T\|^2\hat{W}^T\hat{W}\}$$

Putting the term $-2\Gamma\|I-\alpha\cdot\Gamma^T\sigma\|\sigma^T\tilde{W}\hat{W}^T\sigma$ back on the trace term and bounding the trace term.

$$\frac{1}{\alpha}tr\{-2\alpha\Gamma\|I-\alpha\cdot\sigma\cdot\sigma^T\|\tilde{W}^T\sigma\sigma^T\hat{W}+2\Gamma\|I-\alpha\cdot\sigma\cdot\sigma^T\|\tilde{W}^T\hat{W}+\|I-\alpha\cdot\sigma\cdot\sigma^T\|^2\hat{W}^T\Gamma^T\Gamma\hat{W}\}$$

$$=-\frac{\|I-\alpha\cdot\sigma\cdot\sigma^T\|}{\alpha}tr\{2\alpha\Gamma\tilde{W}^T\sigma\sigma^T\hat{W}-2\Gamma\tilde{W}^T\hat{W}+\|I-\alpha\cdot\sigma\cdot\sigma^T\|\hat{W}^T\Gamma^T\Gamma\hat{W}\}=$$

$$=-\frac{\|I-\alpha\cdot\sigma\cdot\sigma^T\|}{\alpha}tr\{2\alpha\Gamma\tilde{W}^T\sigma\sigma^T(W-\hat{W})-2\Gamma\tilde{W}^T(W-\hat{W})+$$

$$-\|I-\alpha\cdot\sigma\cdot\sigma^T\|(W-\hat{W})\Gamma^T\Gamma(W-\hat{W})=$$

$$=-\frac{\|I-\alpha\cdot\sigma\cdot\sigma^T\|}{\alpha}tr\{2\alpha\Gamma\tilde{W}^T\sigma\sigma^T W-2\alpha\Gamma\tilde{W}^T\sigma\sigma^T\tilde{W}-2\Gamma\tilde{W}^T W+2\Gamma\tilde{W}^T\tilde{W}+$$

$$-\Gamma^2\|I-\alpha\cdot\sigma\cdot\sigma^T\|W^T W+2\Gamma\|I-\alpha\cdot\sigma\cdot\sigma^T\|W^T\tilde{W}-\Gamma^2\|I-\alpha\cdot\sigma\cdot\sigma^T\|\tilde{W}^T\tilde{W}\}=$$

$$<-\frac{\|I-\alpha\cdot\sigma\cdot\sigma^T\|}{\alpha}\{\Gamma(2-\Gamma)\|I-\alpha\cdot\sigma\cdot\sigma^T\|\|\tilde{W}\|^2-\Gamma^2\|I-\alpha\cdot\sigma\cdot\sigma^T\|W_M^2\}=$$

$$<-\frac{\|I-\alpha\cdot\sigma\cdot\sigma^T\|^2}{\alpha}\{\Gamma(2-\Gamma)\|\tilde{W}\|^2-\Gamma^2 W_M^2\}$$

Bounding $$\Delta L<-r^T[2I-(3+\alpha\sigma^T\sigma)K_v^T K_v]-(\alpha\sigma^T\sigma)^2+2\alpha\sigma^T\sigma K_v]r+2(1+\alpha\sigma^T\sigma)r^T K_v^T(D+\varepsilon)+$$

$$+4r^T K_v^T D+2D^T D+$$

$$+(1+\alpha\sigma^T\sigma)[1+\beta^{-1}(1+\alpha\sigma^T\sigma)](D+\varepsilon)^T(D+\varepsilon)-2\alpha\sigma^T\sigma r^T D+$$

$$+\rho^{-1}(\alpha\sigma^T\sigma+\Gamma\|I-\alpha\sigma\sigma^T\|)^2[K_v r+(1+\beta^{-1}(1+\alpha\sigma^T\sigma))(D+\varepsilon)-\beta^{-1}\Gamma\|I-\alpha\sigma\sigma^T\|W^T\sigma]^T$$

$$[K_v r+(1+\beta^{-1}(1+\alpha\sigma^T\sigma))(D+\varepsilon)-\beta^{-1}\Gamma\|I-\alpha\sigma\sigma^T\|W^T\sigma]+$$

$$\beta^{-1}\Gamma^2\|I-\alpha\sigma\sigma^T\|^2\sigma^T WW^T\sigma-2\beta^{-1}(1+\alpha\sigma^T\sigma)\Gamma\|I-\alpha\sigma\sigma^T\|(D+\varepsilon)^T W^T\sigma+$$

$$-2\Gamma\|I-\alpha\cdot\sigma\cdot\sigma^T\|r^T K_v^T W^T\sigma-2\Gamma\|I-\alpha\cdot\sigma\cdot\sigma^T\|(D+\varepsilon)^T W^T\sigma+$$

$$-\frac{\|I-\alpha\cdot\sigma\cdot\sigma^T\|^2}{\alpha}\Gamma(2-\Gamma)\|\tilde{W}\|^2+\frac{\|I-\alpha\cdot\sigma\cdot\sigma^T\|^2}{\alpha}\Gamma^2 W_M^2$$

$$\Delta L<-r^T[2I-(3+\alpha\sigma^T\sigma)K_v^T K_v-(\alpha\sigma^T\sigma)^2+2\alpha\sigma^T\sigma K_v]r+2(1+\alpha\sigma^T\sigma)r^T K_v^T(D+\varepsilon)+$$
$$+4r^T K_v^T D+2D^T D+$$
$$+(1+\alpha\sigma^T\sigma)[1+\beta^{-1}(1+\alpha\sigma^T\sigma)](D+\varepsilon)^T(D+\varepsilon)-2\alpha\sigma^T\sigma r^T D+$$
$$+\rho^{-1}(\alpha\sigma^T\sigma+\Gamma\|I-\alpha\sigma\sigma^T\|)^2[r^T K_v^T K_v r+(1+\beta^{-1}(1+\alpha\sigma^T\sigma))^2(D+\varepsilon)^T(D+\varepsilon)+$$

-continued $$\beta^{-2}\Gamma^2\|I-\alpha\sigma\sigma^T\|^2\sigma^TWW^T\sigma+2(1-\beta^{-1}(1+\alpha\sigma^T\sigma))(D+\varepsilon)^TK_vr-2\beta^{-1}\Gamma\|I-\alpha\sigma\sigma^T\|\sigma^TWK_vr+$$

$$-2(1+\beta^{-1}(1+\alpha\sigma^T\sigma))\beta^{-1}\Gamma\|I-\alpha\sigma\sigma^T\|(D+\varepsilon)^TW^T\sigma]+$$

$$+\beta^{-1}\Gamma^2\|I-\alpha\sigma\sigma^T\|^2\sigma^TWW^T\sigma-2\beta^{-1}(1+\alpha\sigma^T\sigma)\Gamma\|I-\alpha\sigma\sigma^T\|(D+\varepsilon)^TW^T\sigma+$$

$$-2\Gamma\|I-\alpha\cdot\sigma\cdot\sigma^T\|r^TK_v^TW^T\sigma-2\Gamma\|I-\alpha\cdot\sigma\cdot\sigma^T\|(D+\varepsilon)^TW^T\sigma+$$

$$-\frac{\|I-\alpha\cdot\sigma\cdot\sigma^T\|^2}{\alpha}\Gamma(2-\Gamma)\|\tilde{W}\|^2+\frac{\|I-\alpha\cdot\sigma\cdot\sigma^T\|^2}{\alpha}\Gamma^2W_M^2$$

Define $$\eta=(1+\alpha\sigma^T\sigma)I+\rho^{-1}(\alpha\sigma^T\sigma+\Gamma\|I-\alpha\sigma\sigma^T\|)^2>0(\text{condition}(38))\text{and}$$

$$\gamma=\eta+\beta^{-1}\rho^{-1}(1+\alpha\sigma^T\sigma)(\alpha\sigma^T\sigma+\Gamma\|I-\alpha\sigma\sigma^T\|)^2>0$$

Substituting $$\Delta J<-r^T[2I-(\alpha\sigma^T\sigma)^2+2\alpha\sigma^T\sigma K_v-(\eta+2)K_v^TK_v]r+2\gamma\cdot r^TK_v^T(D+\varepsilon)+$$

$$+\gamma[1+\beta^{-1}(1+\alpha\sigma^T\sigma)](D+\varepsilon)^T(D+\varepsilon)+4r^TK_v^TD+2D^TD-2\alpha\sigma^T\sigma r^TD+$$

$$-2\Gamma\|I-\alpha\cdot\sigma\cdot\sigma^T\|[\beta^{-1}\rho^{-1}(\alpha\sigma^T\sigma+\Gamma\|I-\alpha\sigma\sigma^T\|)^2+1]\sigma^TWK_vr-$$

$$2\Gamma\|I-\alpha\cdot\sigma\cdot\sigma^T\|[1+\beta^{-1}(1+\alpha\sigma^T\sigma)][1+\beta^{-1}\rho^{-1}(\alpha\sigma^T\sigma+\Gamma\|I-\alpha\sigma\sigma^T\|)^2](D+\varepsilon)^TW^T\sigma+$$

$$-\frac{\|I-\alpha\cdot\sigma\cdot\sigma^T\|^2}{\alpha}\Gamma(2-\Gamma)\|\tilde{W}\|^2+\frac{\|I-\alpha\cdot\sigma\cdot\sigma^T\|^2}{\alpha}\Gamma^2W_M^2+$$

$$+\beta^{-2}\rho^{-1}(\alpha\sigma^T\sigma+\Gamma\|I-\alpha\sigma\sigma^T\|)^2\Gamma^2\|I-\alpha\sigma\sigma^T\|^2\sigma^TWW^T\sigma+\beta^{-1}\Gamma^2\|I-\alpha\sigma\sigma^T\|^2\sigma^TWW^T\sigma$$

$$\Delta J<-[2-(\alpha\sigma^T\sigma)^2+2\alpha\sigma^T\sigma K_{V\min}-(\eta+2)K_{v\max}^2]\|r\|^2+2\gamma\cdot\|r\|K_{v\max}(D_M+\varepsilon_M)+$$

$$+\gamma[1+\beta^{-1}(1+\alpha\sigma^T\sigma)](D_M+\varepsilon_M)^2+4\|r\|K_{v\max}D_M+2D_M^2+2\alpha\sigma_M^2\|r\|D_M+$$

$$+2\Gamma\|I-\alpha\cdot\sigma\cdot\sigma^T\|[\beta^{-1}\rho^{-1}(\alpha\sigma^T\sigma+\Gamma\|I-\alpha\sigma\sigma^T\|)^2+1]\sigma_MW_MK_{v\max}\|r\|+$$

$$+2\Gamma\|I-\alpha\cdot\sigma\cdot\sigma^T\|[1+\beta^{-1}(1+\alpha\sigma^T\sigma)][1+\rho^{-1}\beta^{-1}(\alpha\sigma^T\sigma+\Gamma\|I-\alpha\sigma\sigma^T\|)^2](D_M+\varepsilon_M)W_M\sigma_M+$$

$$-\frac{\|I-\alpha\cdot\sigma\cdot\sigma^T\|^2}{\alpha}\Gamma(2-\Gamma)\|\tilde{W}\|^2+\frac{\|I-\alpha\cdot\sigma\cdot\sigma^T\|^2}{\alpha}\Gamma^2W_M^2+$$

$$+\rho^{-1}\beta^{-2}(\alpha\sigma^T\sigma+\Gamma\|I-\alpha\sigma\sigma^T\|)^2\Gamma^2\|I-\alpha\sigma\sigma^T\|^2\sigma_M^2W_M^2+\beta^{-1}\Gamma^2\|I-\alpha\sigma\sigma^T\|^2\sigma_M^2W_M^2$$

Define $$\rho_1=2-(\alpha\sigma^T\sigma)^2+2\alpha\sigma^T\sigma K_{V\min}-(\eta+2)K_{v\max}^2>0(\text{see conditions}(33)\text{and}(35))$$

$$\rho_2=\Gamma\|I-\alpha\sigma\sigma^T\|[\beta^{-1}\rho^{-1}(\alpha\sigma^T\sigma+\Gamma\|I-\alpha\sigma\sigma^T\|)^2+1]\sigma_MW_MK_{v\max}+\gamma K_{v\max}\varepsilon_M+$$

$$+[(\gamma+2)K_{v\max}+\alpha\sigma_M^2]D_M$$

$$\rho_3=\gamma[1+\|\beta^{-1}\|(1+\alpha\sigma^T\sigma)](D_M+\varepsilon_M)^2+2D_M^2+$$

$$+2\Gamma\|I-\alpha\cdot\sigma\cdot\sigma^T\|[1+\|\beta^{-1}\|(1+\alpha\sigma^T\sigma)]\cdot[1+\|\rho^{-1}\beta^{-1}\|(\alpha\sigma^T\sigma+\Gamma\|I-\alpha\sigma\sigma^T\|)^2]\cdot(D_M+\varepsilon_M)W_M\sigma_M+$$

$$+\frac{\|I-\alpha\cdot\sigma\cdot\sigma^T\|^2}{\alpha}\Gamma^2W_M^2+\|\beta^{-1}\|\cdot\Gamma^2\|I-\alpha\sigma\sigma^T\|^2[1+\|\rho^{-1}\beta^{-1}\|(\alpha\sigma^T\sigma+\Gamma\|I-\alpha\sigma\sigma^T\|)^2]\sigma_M^2W_M^2$$

$$\Delta J<-\rho_1\|r\|^2+2\rho_2\|r\|+\rho_3-\frac{\|I-\alpha\cdot\sigma\cdot\sigma^T\|^2}{\alpha}\Gamma(2-\Gamma)\|\tilde{W}\|^2$$

completing squares for $\|r\|$ $$\Delta J<-\rho_1\left[\|r\|-\frac{\rho_2}{\rho_1}\right]^2+\frac{\rho_2^2}{\rho_1}+\rho_3-\frac{\|I-\alpha\cdot\sigma\cdot\sigma^T\|^2}{\alpha}\Gamma(2-\Gamma)\|\tilde{W}\|^2$$

which is negative as long as $$\frac{\|I-\alpha\cdot\sigma\cdot\sigma^T\|^2}{\alpha}\Gamma(2-\Gamma)\|\tilde{W}\|^2>\frac{\rho_2^2}{\rho_1}+\rho_3\Rightarrow\|\tilde{W}\|>\frac{1}{\|I-\alpha\cdot\sigma\cdot\sigma^T\|}\sqrt{\frac{\alpha(\rho_2^2+\rho_1\rho_3)}{\rho_1\Gamma(2-\Gamma)}}$$

or $$\rho_1\left[\|r\|-\frac{\rho_2}{\rho_1}\right]^2>\frac{\rho_2^2}{\rho_1}+\rho_3\Rightarrow\|r\|>\frac{\rho_2+\sqrt{\rho_2^2+\rho_1\rho_3}}{\rho_1}$$

From the above results, $\Delta L$ is negative outside a compact set. According to a standard Lyapunov theorem extension, it can be concluded that the tracking error $r(k)$, the actuator error $\tilde{\tau}(k)$ and the NN weights estimates $\tilde{W}(k)$ are Globally Uniformly Ultimately Bounded (GUUB).

REFERENCES

The following materials are incorporated herein by reference.

1. Pending U.S. patent application Ser. No. 09/553,601 entitled "Backlash compensation using neural network" by Selmic et al., filed Apr. 20, 2000.
2. U.S. Pat. No. 6,185,469.
3. U.S. Pat. No. 6,064,997.
4. U.S. Pat. No. 5,943,660.
5. A. R. Barron, "Universal approximation bounds for superposition of a sigmoidal function," *IEEE Trans. Inform. Theory*, vol. 39, no. 3, pp. 930–945, 1993.

6. L. A. Bernotas, P. E. Crago, and H. J. Chizeck, "Adaptive control of electrically stimulated muscle," *IEEE Trans. on Biomedical Engineering*, no. 34, pp. 140–147, 1987.
7. C. I. Byrnes and W. Lin, "Losslessness, feedback equivalence, and the global stabilization of discrete-time nonlinear systems," *IEEE Transactions of Automatic Control*, vol. 39, no. 1, pp. 83–98, January 1994.
8. J. Campos, F. L. Lewis, and R. Selmic, "Backlash compensation in discrete time nonlinear systems using dynamic inversion by neural networks: A preliminary approach," *submitted to the special issue on Developments in Intelligent Control for Industrial Applications of the Int. Journal of Adaptive Control and Signal Processing*, November, 1999.
9. J. Campos and F. L. Lewis, "Deadzone compensation in discrete time using adaptive fuzzy logic," *Proc. IEEE Conference on Decision and Control*, pp. 2920–2926, Tampa, Fla., 1998.
10. F. C. Chen and H. K. Khalil, "Adaptive control of nonlinear discrete-time systems using neural networks," *IEEE Trans. on Automatic Control*, vol. 450, no. 5, pp. 791–801, May 1995.
11. C. A. Desoer and S. M. Shahruz, "Stability of dithered nonlinear systems with backlash or hysteresis," *Int. J. Control*, vol. 43, no. 4, pp. 1045–1060, 1986.
12. M. Grundelius and D. Angelli, "Adaptive control of systems with backlash acting on the input," *Proceedings of the 35th Conference on Decision and Control*, pp. 4689–4694, Kobe, Japan, 1996.
13. V. Gullapalli, J. A. Franklin, and H. Benbrahuim, "Acquiring robot skills via reinforcement learning," *IEEE Cont. Syst.*, pp. 13–24, February 1994.
14. W. M. Haddad, J. L. Fausz, and V. Chellaboina, "Optimal discrete-time control for nonlinear cascade systems," *Proceedings of the American Control Conference*, pp. 2175–2176, Albuquerque, N.Mex., 1997.
15. C. W. Han and Y. X. Zhong, "Robust adaptive control of time-varying systems with unknown backlash nonlinearity," *Proceedings of the American Control Conference*, pp. 763–767, Albuquerque, N.Mex., 1997.
16. K. Hornik, M. Stinchombe, and H. White. "Multilayer feedforward networks are universal approximators," *Neural Networks* vol. 2, pp. 359–366, 1989.
17. B. Igelnik and Y-H. Pao, "Stochastic choice of basis functions in adaptive function approximation and the functional-link net," *IEEE Trans. on Neural Networks*, vol. 6, no. 6, pp. 1320–1329, November 1995.
18. P. A. Ioannou and A. Datta, "Robust adaptive control: a unified approach," *Proc. IEEE*, vol. 790, no. 12, pp. 1736–1768, 1991.
19. S. Jagannathan, and F. L. Lewis, "Discrete-Time Control of a Class of Nonlinear Dynamical Systems," *Int. Journal of Intelligent Control and Systems*, vol. 1, no. 3, pp. 297–326, 1996.
20. S. Jagannathan, "Robust backstepping control of robotic systems using neural networks," *Proc. Of the IEEE Conf. on Decision & Control*, pp. 943–948, December 1998.
21. J.-H. Kim, S.-W. Lee, and K.-C Kim, "Fuzzy precompensation of PID controllers," *Proc. IEEE Conf. Control Applications*, pp. 183–188, September. 1993.
22. J.-H. Kim, J.-H. Park, S.-W. Lee, and E. K. P Chong, "Fuzzy precompensation of PD controllers for systems with deadzones," *J. Int. And Fuzzy Systems*, vol. 1, pp. 125–133, 1993.
23. J.-H. Kim, J.-H. Park, S.-W. Lee, and E. K. P Chong, "A two-layered fuzzy logic controller for systems with deadzones," *IEEE Trans. Industrial Electron.*, vol. 41, no. 2, pp. 155–162, April. 1994.
24. B. Kosko, *Neural Networks and Fuzzy Systems*, Prentice Hall, N.J., 1992.
25. M. Krstic, I. Kanellahopoulos, and P. Kokotovic, *Nonlinear and Adaptive Control Design*, John Wiley & Sons, New York, N.Y., 1995.
26. J. Leitner, A. Calise and J. V. R. Prasad, "Analysis of adaptive neural networks for helicopter flight control," *Journal of Guidance, Control, and Dynamics*, vol. 20, no. 5, pp. 972–979, September–October 1997.
27. F. L. Lewis, C. T. Abdallah, and D. M. Dawson, *Control of Robot Manipulators*, MacMillan, N.Y., 1993.
28. F. L. Lewis, S. Jagannathan, and A. Yesildirek, *Neural Network Control of Robot Manipulators and Nonlinear Systems*, Taylor & Francis, Philadelphia, Pa. 1999.
29. F. L. Lewis, K. Liu, R. Selmic, and L.-X. Wang, "Adaptive fuzzy logic compensation of actuator deadzones," *J. Robotic Systems*, pp. 501–511, 1997.
30. F. L. Lewis, A. Yesildirek, and K. Liu, "Neural net robot controller with guaranteed tracking performance," *IEEE Trans. Neural Networks*, vol. 6, no. 3, pp. 703–715, 1995.
31. F. L. Lewis, A. Yesildirek, and K. Liu, "Multilayer Neural-Net Robot Controller with Guaranteed Tracking Performance," *IEEE Trans. Neural Networks*, vol. 7, no. 2, pp. 388–399, 1996.
32. M. B. McFarland and A. J. Calise, "Multilayer neural network and adaptive nonlinear control of agile anti-air missiles," *Preprint*, 1999.
33. K. S. Narendra and A. M Annaswamy, "A new adaptive law for robust adaptation without persistent excitation," *IEEE Trans. Automatic Control*, vol. 32, no. 2, pp. 4–27, 1990.
34. K. S. Narendra and K. Parthasarathy, "Identification and control of dynamical systems using neural networks," *IEEE Trans. Neural Networks*, vol. 4, no. 6, pp. 982–988, 1993.
35. M. M. Polycarpou and P. A. Ioannou., "Identification and control using neural networks models: Design and stability analysis," *Technical Report* 91-09-01, Department of Electrical Engineering Systems, University of Southern California, 1991.
36. N. Sadegh, "A perceptron network for functional identification and control of nonlinear systems," *IEEE Trans. Neural Networks*, vol. 4, pp. 1823–1836, 1992.
37. R. M. Sanner and J-J. E. Slotine, "Gaussian networks for direct adaptive control," *IEEE Trans. Neural Networks*, vol. 3, pp. 837–863, 1992.
38. R. Selmic and F. L. Lewis, "Backlash Compensation in Nonlinear Systems using Dynamic Inversion by Neural Networks," *To appear at the Conference in Control and Automation*, Kona, Hi., August 1999.
39. R. Selmic and F. L. Lewis, "Deadzone compensation in nonlinear systems using neural networks," *Proc. IEEE Conference Decision and Control*, Tampa, Fla., 1998.
40. J. J. E, Slotine, and W. Li, *Applied Nonlinear Control*, New Jersey: Prentice-Hall, 1991.
41. J. J. E. Slotine and W. Li., "Adaptive manipulator control: a case study," *IEEE Trans. Automat. Control*, vol. 33, no. 11, pp. 995–1003, November. 1988.
42. Y. D. Song, T. L. Mitchell, and H. Y. Lai, "Control of a class of nonlinear uncertain systems via compensated inverse dynamics approach," *IEEE Trans. Automatic Control*, vol. 39, no. 9, pp. 1866–1871, September 1994.

43. G. Tao, "Adaptive backlash compensation for robot control," *Proceedings IFAC World Congress*, pp. 307–312, San Francisco, 1996.
44. G. Tao and P. V. Kokotovic, "Adaptive control of plants with unknown dead-zones," *Proceedings, American Control Conf.*, pp. 2710–2714, Chicago, 1992.
45. G. Tao and P. V. Kokotovic, *Adaptive Control of Systems with Actuator and Sensor Nonlinearities*, John Wiley & Sons, Inc., New York, 1996.
46. G. Tao and P. V. Kokotovic, "Continuous-time adaptive control of system with unknown backlash," *IEEE Trans. Automatic Control*, vol. 40, no. 6, pp. 1083–1087, June 1995.
47. G. Tao and P. V. Kokotovic, "Discrete-time adaptive control of systems with unknown nonsmooth input nonlinearities," *Proceedings of the 33$^{rd}$ Conference on Decision and Control*, pp. 1171–1176, Lake Buena Vista, Fla., 1994.
48. G. Tao and P. V. Kokotovic, "Discrete-time adaptive control of nonlinear systems with unknown deadzones," *Int. J. Control*, vol. 61, no. 1, pp. 1–17, 1995.
49. M. Vandergrift, F. L. Lewis, S. Jagannathan, and K. Liu, "Adaptive fuzzy logic control of discrete-time dynamical systems," *Proc. IEEE Int. Symp. Intelligent Control*, pp. 395–401, August. 1995.
50. P. J. Werbos, "Backpropagation through time: what it does and how to do it," *Proc. IEEE*, vol. 78, no. 10, pp. 1550–1560, 1990.
51. P. J. Werbos, "Neurocontrol and supervised learning: an overview and evaluation," in *Handbook of Intelligent Control*, D. A. White and D. A. Sofge, Eds. NY: Van Nostrand Reinhold, 1992, pp. 65–89.
52. P.-C. Yeh and P. Kokotovic, "Adaptive control of a class of nonlinear discrete-time systems," *International Journal of Control*, vol. 62, no. 2, pp. 303–324, 1995.
53. Y. Zhang and Y. C. Soh, "Robust adaptive control of uncertain discrete-time systems," *Automatica*, pp. 321–329, September 1998.

What is claimed is:

1. A discrete-time adaptive neural network compensator for compensating backlash of a mechanical system, comprising:
   a feedforward path;
   a proportional derivative tracking loop in the feedforward path;
   a filter in the feedforward path;
   a neural network in the feedforward path and coupled to the filter, the neural network configured to compensate the backlash by estimating an inverse of the backlash and applying the inverse to an input of the mechanical system; and
   wherein a tracking error $r(k)$, a backlash estimation error $\tilde{\tau}(k)$, and a weight estimation error $\tilde{W}(k)$ of the neural network are each weighted in the same Lyapunov function.

2. The compensator of claim 1, wherein the tracking error, the backlash estimation error, and the weight estimation error are uniformly ultimately bounded.

3. The compensator of claim 1, wherein unknown backlash parameters are learned in real time.

4. The compensator of claim 1, wherein the mechanical system comprises an actuator or robot.

5. A discrete time adaptive neural network compensator for compensating backlash of a mechanical system, comprising:
   a filter in a feedforward path;
   a neural network in the feedforward path, the neural network configured to compensate the backlash by estimating an inverse of the backlash and applying the inverse to an input of the mechanical system; and
   means for tuning the neural network in discrete time without a certainty equivalence assumption.

6. The compensator of claim 5, wherein unknown backlash parameters are learned in real time.

7. The compensator of claim 5, wherein the mechanical system comprises an actuator or robot.

8. A method for compensating backlash in a mechanical system, comprising:
   estimating an inverse of the backlash using a discrete-time neural network in a feedforward path;
   weighting a tracking error $r(k)$, a backlash estimation error $\tilde{\tau}(k)$, and a weight estimation error $\tilde{W}(k)$ of the neural network in the same Lyapunov function; and
   applying the inverse to an input of the mechanical system to compensate the backlash.

9. The method of claim 8, wherein the tracking error, the backlash estimation error, and the weight estimation error are uniformly ultimately bounded.

10. The method of claim 8, wherein unknown backlash parameters are learned in real time.

11. The method of claim 8, wherein the mechanical system comprises an actuator or robot.

12. A discrete-time method of adaptively compensating backlash in a mechanical system, comprising:
   estimating an inverse of the backlash using a neural network in a feedforward path;
   adjusting weights of the neural network using an algorithm to achieve closed loop stability without a certainty equivalence assumption; and
   applying the inverse to an input of the mechanical system to compensate the backlash.

13. The method of claim 12, wherein a tracking error, backlash estimation error, and weight estimation error are uniformly ultimately bounded.

14. The method of claim 12, wherein unknown backlash parameters are learned in real time.

15. The method of claim 12, wherein the mechanical system comprises an actuator or robot.

* * * * *